United States Patent
Bennett

(10) Patent No.: US 10,992,966 B2
(45) Date of Patent: Apr. 27, 2021

(54) MOBILE PHONE AS A POLICE BODY CAMERA OVER A CELLULAR NETWORK

(71) Applicant: Callyo 2009 Corp, St. Petersburg, FL (US)

(72) Inventor: Christopher Ryan Bennett, St. Petersburg, FL (US)

(73) Assignee: CALLYO 2009 CORP, St. Petersburg, FL (US)

( * ) Notice: Subject to any disclaimer, the term of this patent is extended or adjusted under 35 U.S.C. 154(b) by 0 days.

(21) Appl. No.: 16/035,227

(22) Filed: Jul. 13, 2018

(65) Prior Publication Data

US 2019/0020905 A1    Jan. 17, 2019

Related U.S. Application Data

(60) Provisional application No. 62/532,708, filed on Jul. 14, 2017.

(51) Int. Cl.
| | |
|---|---|
| *H04N 21/2187* | (2011.01) |
| *H04N 5/917* | (2006.01) |
| *H04W 60/00* | (2009.01) |
| *H04N 21/472* | (2011.01) |
| *H04N 21/4627* | (2011.01) |
| *H04N 21/4223* | (2011.01) |
| *H04N 21/442* | (2011.01) |
| *H04N 21/414* | (2011.01) |

(Continued)

(52) U.S. Cl.
CPC .......... *H04N 21/2187* (2013.01); *H04N 5/77* (2013.01); *H04N 5/917* (2013.01); *H04N 21/41407* (2013.01); *H04N 21/4223* (2013.01); *H04N 21/44245* (2013.01); *H04N 21/4627* (2013.01); *H04N 21/47217* (2013.01); *H04W 60/00* (2013.01); *H04N 5/04* (2013.01); *H04W 84/042* (2013.01)

(58) Field of Classification Search
CPC ................. H04N 21/2187; H04N 5/77; H04N 21/41407; H04N 21/4223; H04N 21/44245; H04N 21/4627; H04N 21/47217; H04N 5/917; H04N 5/04; H04W 60/00; H04W 84/042
See application file for complete search history.

(56) References Cited

U.S. PATENT DOCUMENTS 9,402,090 B1    7/2016  Bliss et al.
9,516,354 B1   12/2016  Verheem et al.
(Continued)

OTHER PUBLICATIONS

PCT International Search Report and Written Opinion, PCT Application No. PCT/US2018/042108, dated Sep. 21, 2018, eleven pages.

*Primary Examiner* — Tat C Chio
(74) *Attorney, Agent, or Firm* — Daniel R. Bestor

(57) ABSTRACT

Embodiments of the systems and methods described herein relate to providing body worn camera functionality to users, such as on their mobile device. Additionally, capabilities of mobile devices such as mobile telephonic devices are leveraged to stream captured audio/visual data in real-time and provide robust notification and safety features to users in order to democratize access to body worn cameras. The additional features promote increased use of the disclosed systems and methods as a safety tool while simultaneously providing increased transparency in law enforcement.

20 Claims, 6 Drawing Sheets

(51) Int. Cl.
*H04N 5/77* (2006.01)
*H04W 84/04* (2009.01)
*H04N 5/04* (2006.01)

(56) References Cited

U.S. PATENT DOCUMENTS

| | | | |
|---|---|---|---|
| 2012/0102521 A1* | 4/2012 | Mallika | H04N 21/2402 |
| | | | 725/32 |
| 2014/0368601 A1* | 12/2014 | deCharms | H04W 4/021 |
| | | | 348/14.02 |
| 2015/0137972 A1* | 5/2015 | Nepo | G08B 15/004 |
| | | | 340/539.13 |
| 2016/0119667 A1* | 4/2016 | Layson, Jr. | H04N 21/6131 |
| | | | 386/226 |
| 2017/0086050 A1 | 3/2017 | Kerning et al. | |
| 2017/0195562 A1* | 7/2017 | Desai | H04N 5/23238 |
| 2017/0264604 A1* | 9/2017 | Drako | H04L 63/083 |
| 2017/0323663 A1* | 11/2017 | Boykin | G08B 13/19613 |

* cited by examiner

MOBILE PHONE AS A POLICE BODY CAMERA OVER A CELLULAR NETWORK

CROSS REFERENCE TO RELATED APPLICATIONS

This application claims the benefit of U.S. Provisional Application 62/532,708, filed Jul. 14, 2017, which is incorporated by reference herein in its entirety.

BACKGROUND

1. Field of Art

The present disclosure generally relates to streaming on a mobile telephonic device in the field of law enforcement.

2. Background of the Invention

Police officers and other agents conduct investigations and initiate or otherwise come in contact with numerous people during the course of their duties. For example, a police officer may conduct a traffic stop and engage with the driver and/or passengers of the vehicle. The vast majority of police engagement with citizens amounts to nothing more than routine interactions during the course of their duties. However, there always exists the small probability of an altercation. In recent years, several high profile altercations have ushered in an era of increased scrutiny of police and calls for enhanced transparency in law enforcement. One way in which law enforcement agencies have sought to enhance transparency through the adoption of video capture capabilities beyond the dash cameras commonly installed within law enforcement vehicles. One example of video capture capability is a body worn camera ("BWC") that allows for video capture capabilities that travel with the officer in the field.

BWCs are often hardware devices affixed to an officer's uniform for capturing the officer's activities and interactions with the public. BWC hardware is typically single-purpose, specially manufactured pieces of equipment for patrol officers who respond to multiple calls for service in a single shift. However, due to the significant cost of BWC hardware, many law enforcement agencies have been slow to adopt BWC hardware for their officers, and those that do often will not provide one for all members of the department.

BWCs not only provide transparency in law enforcement officer activity, they provide video data that can be utilized for evidence and/or identification of a person. As law enforcement agencies began to implement such technologies, captured video evidence from officers' perspectives vindicated many officers from false claims and thus are commonly viewed as a safety measure for officers themselves as equally as they are a tool to meet public calls for transparency. Even with the demonstrated benefits of equipping officers with BWCs, not all law enforcement agencies have implemented BWCs, often due to budget issues and/or limitations in commonly available BWCs themselves. The lack of BWC availability can put an officer in a precarious situation where an action was justified but there exists no evidence to refute claims made in the court of public opinion.

BRIEF DESCRIPTION OF THE DRAWINGS

The teachings of the embodiments can be readily understood by considering the following detailed description in conjunction with the accompanying drawings.

Figure (FIG. 1 is a block diagram illustrating an example environment for configuring an existing work and/or personal mobile device of a law enforcement officer (or other first responder) as body worn camera ("BWC"), according to an example embodiment.

DETAILED DESCRIPTION

Figure 1:
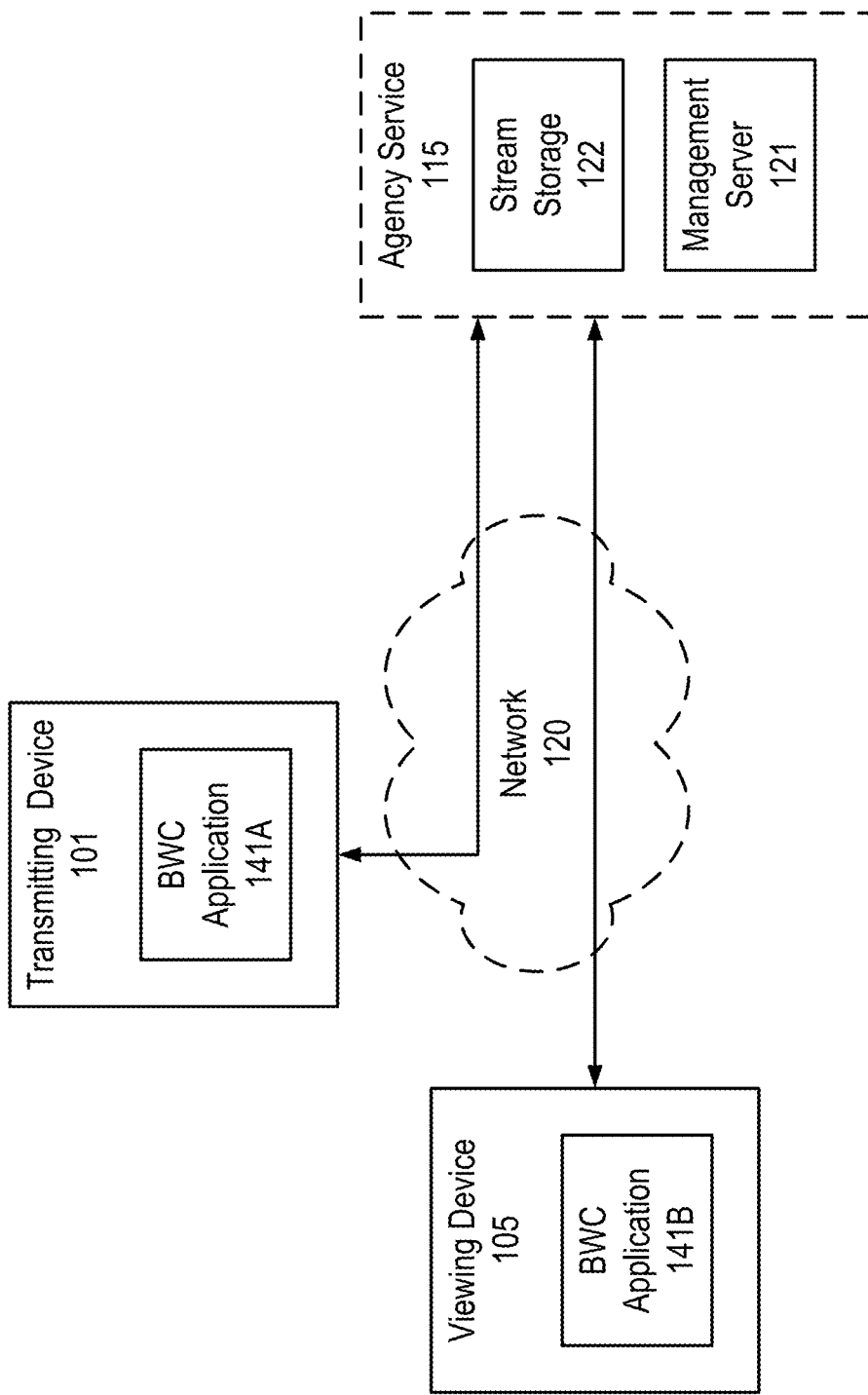

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the example embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

In order to provide officers the option of utilizing a body worn camera ("BWC"), methods, systems, and non-transitory computer readable storage mediums comprising executable computer program code are devised to provide video capture capabilities to officers. In their various embodiments, the methods, systems, and storage mediums presented herein may democratize access to video and audio capture, among other capabilities, on existing mobile telephonic devices (e.g., smartphone devices) configured to provide BWC functionality in compliance with department evidentiary standards. For example, systems (methods and non-transitory computer readable storage mediums) are described herein for configuring existing work and/or personal mobile telephonic devices of law enforcement officers (or other first responders) to securely record and transmit captured audio and video data that also may be viewed by other officers (and/or other first responders and/or the public) in real-time. However, embodiments need not be limited to the realm of law enforcement, as various industries may see a need for secure audio/visual data capture of employee activities with existing mobile telephonic devices.

Various embodiments may enable an officer's existing mobile telephonic device configured with a BWC application to transmit and/or receive live video and/or audio (e.g., audio/visual data), intelligently configure notification of concerned parties, and generate evidence-grade video and/or audio recordings in compliance with departmental evidentiary standards. In addition, various embodiments are devised to reduce physical data storage requirements on existing mobile devices while maintaining fidelity of evidence and real-time transmitting capabilities. Thus, a BWC application may be transmitted to or otherwise provided to and installed on the mobile device of an officer. The BWC application is configured to interface with features and functionality of the mobile device to perform one or more of its functions described herein.

Example embodiments of the BWC application may interface with one or more image capture devices of a mobile device and one or more microphones of a mobile device to capture visual or other image data (e.g., video and/or images) and/or audio data for processing. Example embodiments of the BWC application interface with a network interface of the mobile device to transmit and/or receive data such as video, audio, and/or notification data. Example embodiments of the BWC application may interface with a native sharing feature (e.g., a sharing feature of the operating system) of a mobile device to transmit and/or receive one or more notifications (e.g., to/from a server system such as an agency service). Example embodiments of the BWC application may provide settings to configure notification preferences for agency service notifications, such as to receive notifications in-application, native notifications, via email, SMS, or multiple as well as configure preferences for notifying concerned parties based on their preferences. In some embodiments, the BWC application may transmit notification preferences to the agency service responsive to provided selections within the BWC application.

Example embodiments of the BWC application generate an interface with options to "Go Live" and/or "Tune In." Selection of "Go Live" may cause the BWC application to generate an interface with a "Start Stream" option and/or otherwise interface with a hardware button for receiving an indication to "Start Stream." Selection thereof causing the BWC application to capture and transmit audio/visual data (e.g., by streaming the audio/visual data to the agency service). Similarly, the BWC application may generate an interface (e.g., while the BWC application is actively capturing audio/visual data for streaming) with a "Stop Stream" option and/or otherwise interface with a hardware button for receiving an indication to "Stop Stream."

In response to detection of a selection or other indication to "Start Stream", the BWC application interfaces with the image and/or audio capture devices to capture audio and/or visual data and may additionally interface with a network interface of the mobile device to stream captured data, which may occur in real-time. In turn, in response to detection of a selection or other indication to "Stop Stream," the BWC application may cease the capturing of data from the image and/or audio capture devices. In instances where the BWC application is streaming the captured data in real-time, "Stop Stream" also ceases the streaming of captured data in real-time as image and/or audio data capture has ceased.

Example embodiments of the BWC application route the stream of captured data (e.g., a video stream comprising audio and visual data) through an agency service (e.g., a server system). In some embodiments, the BWC transmits the audio and visual data independently, such as in a video stream (e.g., comprising only visual image data) and an audio stream that may be synchronized based on one or more time stamps during viewing and/or for subsequent streaming to viewers.

Embodiments of the agency service may be one or more servers for receiving and/or streaming audio/visual data in support of BWC application users. The one or more servers can be dedicated to a particular function such as receiving stream data and/or transmitting received stream data to viewers, or also provide additional services. In some embodiments, one or more components of the agency service are provisioned through a third party service such as a cloud provider that sells compute and storage resources.

Once the BWC application concludes the streaming of captured data, it may purge the captured data such that mobile device on which the data was captured does not possess a copy of the captured data. Example embodiments of the BWC application may stream captured video data to the agency service in real-time in addition to retaining a local copy of the captured data or a portion thereof. The real-time streaming of captured visual and/or audio data may be adjusted based on network conditions while a local copy of visual and/or audio data is retained in high quality and streamed to the agency service asynchronously. Thus, if network conditions are degrade during the time of transmission, the BWC application may adjust stream quality so that the agency service receives a compressed (lower-resolution) version of captured data (e.g., visual data) in real-time, whereas the local copy of captured data stored on the mobile device is full (uncompressed) quality. Example embodiments of the BWC application transmit one or more portions of the local copy to the agency service when network conditions improve and/or in response to establishing a WiFi connection in order to update compressed portions of the video data that were received in real-time and stored by the agency service. Example embodiments of the BWC application may encrypt captured data stored locally on the mobile device to prevent any tampering of the captured data and thus mitigate potential of the mobile device being entered into evidence or requested in discovery.

Example embodiments of the BWC application may transmit audio and video streams separately over the same network connection, while giving priority to the audio stream. Example embodiments of the BWC application may monitor and determine a quality of network conditions (e.g., available bandwidth, throughput, latency, etc.) at the mobile device and adjust a quality of streamed audio and/or video from the mobile device based on the determined quality of the network conditions. Additionally, in the case of separate streams, the BWC application may prioritize audio streaming over video stream based on available bandwidth.

Environment and Implementation of the Body Worn Camera System

Figure (FIG. 1 is a block diagram illustrating an example environment 100 for configuring an existing work and/or personal mobile device of a law enforcement officer (or other first responder) as body worn camera ("BWC"), according to an example embodiment. Within the environment 100, a mobile device is configured to securely capture and stream audio and/or visual data (e.g., in video stream or independent audio and visual data streams). The mobile device may stream captured data in real-time such that other officers (and/or other first responders) can also view the streamed data in real-time.

The environment 100 may include one or more officer/user devices functioning as transmitting devices 101 or viewing devices 105 and at least one agency service server system 115, all of which may have the ability to intercommunicate via a network 120. As shown the environment 100 includes an agency service 115 and one transmitting device 101 and one viewing device 105 for ease of explanation. However, example embodiments may include many viewing devices 105, transmitting device 101, and one or more agency services 115. Specifically, a number of agency services 115 of components thereof (e.g., stream storage) may be positioned in disparate physical locations across the network 120 to more efficiently support transmitting devices 101 and/or viewing devices 105 accessing the network 120 from disparate access points. Additionally, transmitting devices 101 may also function as viewing devices 105 and vice versa depending on configuration, but also may be dedicated to either function.

The network 120 represents a communication network that facilitates the transmission of data between one or more of the officer/user devices (e.g., 101, 105) and the agency service 115. Thus for example, the network 120 may be a communication pathway between agency services 115, transmitting devices 101, viewing devices 105, and other entities (not shown). In one embodiment, the network 120 includes standard communications technologies and/or protocols and can include the Internet, PSTN, and provider networks (e.g., those of wireless service providers). Oftentimes, these communications technologies and/or protocols carry PSTN, provider, and/or Internet related data. Thus, the network 120 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Thus, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including analog audio (e.g., for last mile PSTN communications), digital audio and video (e.g., as a file or streaming with Real Time Streaming Protocol), the hypertext markup language (HTML), the extensible markup language (XML), JavaScript, JSON, VBScript, FLASH, the portable document format (PDF), Voice Over Internet Protocol (VOIP) data etc. In addition, all or some of the data exchanged over the network 120 can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above. For example, some government agencies and the military may operate networks auxiliary to the internet and/or PSTN.

In an example embodiment, an officer device/user device, e.g., 101, 105, is a mobile computing device with network 120 access capabilities for transmitting and receiving data over the network. The officer/user devices 101, 105 may be mobile telephonic devices or wireless enabled mobile computing devices (e.g., laptops, netbooks, tablets, smart telephones, etc.) and/or wired and/or wireless home computing devices (e.g., a laptop, personal computer, media computer, etc.) and/or Internet of Things (IoT) devices that include applications such as a BWC application to configure the device for streaming operations (e.g., transmitting and/or viewing streams) as described herein and frameworks for accessing data over a network 120. Example applications for accessing data over network 120 include applications such as a BWC application 141, a web browser, command-line interfaces, widgets, mobile applications, utilities, etc., that request, send, and/or receive data over the network 120 and may present received data to the user (e.g., as rendered web content, user account information and preferences, video streams, audio streams, etc.) or otherwise request, send and/or receive data for application function such as data supporting BWC application functions described herein.

In an embodiment, the transmitting device 101 is a mobile device capable of collecting data and transmitting data (e.g., wirelessly) over network 120. In many instances, the transmitting device 101 is a mobile device with telephonic capabilities (e.g., a mobile telephonic device). The data transmissions over the network 120 may occur over one or more of a telephony network, telephony data network, and/or wireless internet connection such as WiFi. Some examples of a transmitting device 101 include a mobile phone, tablet or notebook computer. Example embodiments of the transmitting device 101 as a mobile telephonic device include feature phones and smart phones. Accordingly, a given mobile telephonic device or other device operated as a transmitting device 101 may not necessarily include or support all of the functionality ascribed herein to the transmitting device 101 or BWC application 141A function due to differences in device capabilities.

In one embodiment, the transmitting device 101 executes a BWC application 141A to transmit live video and/or audio data streams and generate evidence-grade video and/or audio recordings in compliance with departmental evidentiary standards. The BWC application 141A may be downloaded to or otherwise provided to the transmitting device 101 and installed on the transmitting device 101 to provide BWC application 141A functionality when executed. For example, the BWC application 141A may provide functionality to transmit and/or receive live video and/or audio streams, intelligently notify concerned parties, and generate evidence-grade video and/or audio recordings in compliance with departmental evidentiary standards with the transmitting device 101.

The BWC application 141A may interface with one or more image capture devices (e.g., an image/video sensor) and/or one or more audio capture devices (e.g., a microphone) of the transmitting device 101. In turn, the BWC application 141A accesses an image capture device and/or audio capture device to capture audio/visual data such as video data for transmission to the agency service 115.

The BWC application 141A may interface with a network interface of the transmitting device 101 to transmit the audio/visual data over the network 120 to the agency service 115. In one embodiment, the audio/visual data is a video comprising image and audio data. The video comprising the image and audio data may be streamed in real-time via the network interface to the agency service 115. In some embodiments, the audio/visual data is transmitted separately, thus the BWC application 141A may transmit video comprising image data and audio comprising audio data. Accordingly, the video comprising image data and audio comprising audio data may be streamed separately (e.g., as independent streams) in real-time via the network interface to the agency service 115. The separate, independent streams, may be encapsulated within in a single multimedia stream configured to have an independent channel for each stream (e.g., respective channels for respective streams). For example, these independent streams may be encapsulated in a single stream, such as by the encapsulation of independent audio, visual, and/or data stream each on an independent channel. In one embodiment, WebRTC (Web Real-Time-Communication) encapsulates independent streams in a single multimedia stream.

The BWC application 141A may interface with a native sharing feature (e.g., a sharing feature of the operating system) of the transmitting device 101 to transmit and/or receive one or more notifications (e.g., to/from a server system or agency service). Alternatively, the BWC application 141A may handle notifications separately or in addition to a native sharing feature. In either instance, the BWC application 141A may provide options to configure notification settings for notifying one or more other mobile devices (e.g., viewing device 105) when the transmitting device 101 streams audio/visual data to the agency service 115.

An example embodiment of a BWC application 141 providing functionality for transmitting live video and/or audio data is described in more detail with reference to FIG. 2.

The agency service 115 represents a collection of compute devices and related storage mediums (e.g., a server or server system) that are configured for performing various activities such as providing streaming services and supporting other BWC functionality over the network 120. For example, the agency service 115 may receive data streamed from the transmitting device 101 over the network 120, store the streamed data, and stream the stored data to the viewing device 105. The agency service 115 may also store notification preference and other data in support of one or more transmitting devices 101 and/or viewing devices 105.

In some example embodiments, the agency service 115 includes a stream storage 122 to store and transmit streaming data between viewing and transmitting devices 101, 105 and a management server 121 to manage streaming operations and data stored on the stream storage 122. The stream storage 122 and management server 121 need not be co-located within the agency service 115 as shown, and a single management server 121 may manage multiple stream storage 122. Additionally, in some embodiments, the stream storage 122 and management server 121 may be implemented on a single server or collection thereof that combines their functionality.

The stream storage 122 stores data streamed to the agency service 115 from the transmitting device 101. For example, the stream storage 122 may store audio/visual data such as a video comprising image and audio data. In some embodiments, the stream storage 122 receives an audio stream including audio separately from a video stream including visual data from the transmitting device 101. The stream storage 122 may synchronize and optionally merge the audio stream and video stream based on one or more timestamps such that a video comprising both image and audio data may be streamed to viewing devices 105. Alternatively, the stream storage 122 may stream video and audio separately. In either instance, the steam storage 122 may stream audio/visual data to viewing devices 105. Additionally, the stream storage 122 may store collected GPS data, chat messages, detected facial images, detected license plate images, Speech-to-text, and/or other data and information described herein as well as timestamps for such data in association with a given stream. In this way, the stream storage 122 may present the sum of collected data for the viewing of historical streams and their associated data.

In some embodiments, the stream storage 122 receives an audio stream separately from a video stream over a single stream (e.g., connection) that comprises multiple channels. Each channel is in essence a separate stream (e.g., are independent of each other in terms of desired data rate, bandwidth consumptions, etc.), but they may be encapsulated in a single multimedia stream. In some embodiments, a WebRTC multimedia stream encapsulates the multiple independent channels/stream within a single multimedia stream. As such, independent streams, as referred to herein, should be understood to include stream independence as channels over a same multimedia stream (e.g., via WebRTC). Thus, for example, a single stream may encapsulate an audio stream comprising audio data and a video stream comprising visual data. In addition, the single stream may encapsulate other streams, such as a data stream comprising GPS data, chat messages, notifications, alerts (e.g., distress alert), commands (e.g., balance triggers), time stamps therewith, and the like. The stream storage 122 may similarly transmit independent audio, visual, and/or data streams (or channels) encapsulated in a single stream. However, in some instances, the stream storage 122 may merge one or more of the channels (e.g., audio and visual data) for transmission.

Thus, the stream storage 122 and agency service 115 in general may function as a central hub for distributing audio, visual, and other data received from transmitting device 101 to viewing device 105 and storing the received audio, visual, and other data throughout the process. In some instances, the stream storage 122 may receive audio, visual, and/or data (e.g., chat messages, alerts, balance triggers, or other commands/information etc.) from viewing devices 105 in a similar fashion, depending on the embodiment, and route the received information from the viewing device 105 to a transmitting device 101 in a similar fashion (e.g., over the respective channel/stream), as well as store the information received from the viewing device.

In some embodiments, this routing of information through the agency service 115 enables processing features for received audio and visual data. Example processing features that may be implemented at the agency service 115 are discussed within reference to an analysis module 230 that may be included with a BWC application 141 in FIG. 2. The agency service 115, due to advantages in processing power, may preferably perform one or more of the processing features discussed with reference to the analysis module 230 (e.g., by default or as a configurable option). Thus, for example, the agency service 115 may perform one or more operations of the analysis module (e.g., by incorporating an analysis module or one or more of its ascribed functions) to analyze received information and provide text-to-speech recognition (either natively or by querying an API) for transcription/subtitling, license plate recognition (e.g., of the characters in a plate and storage in association with a detected image thereof) and processing through one or more databases, and facial recognition (e.g., of a person and storage of detected images or recognition features thereof) and processing of the image and/or recognized features through one or more databases.

The agency service 115 may wholly perform these operations and/or receive pertinent data for performing these operations. As an example, the agency service 115 may receive a facial image from a transmitting device 101 or a facial image from a viewing device 105 such as by detection and transmitting of the image (e.g., by transmitting device 101) or via screen capture, manual selection, or otherwise (e.g., at the transmitting device 101 or viewing device 105 from real-time and/or historical visual data) and subsequent transmitting of the image to the agency service. As can be seen, functions described with reference to the analysis module on a user device (e.g., while the user device is transmitting, such as with transmitting device 101) can be equally applicable to processing of audio and visual data by the agency service 115 because streams are routed through the agency service. Further, in some embodiments, the independency of audio, visual, and data streams (e.g., as channels or even wholly independent) enables the agency service to efficiently apply respective analysis module processing functions (e.g., audio vs image processing) to respective stream types.

The management server 121 manages streaming operations and data stored on the stream storage 122. For example, the management server 121 may register mobile devices executing BWC applications for access to the stream storage 122 and other agency service 115 functionality. Mobile devices may register with transmitting and/or viewing privileges. Additionally, the management server 121 may store BWC applications for transmission to mobile devices and/or upload BWC applications to $3^{rd}$ party application stores to provide BWC applications to respective user devices including mobile telephonic devices. The management service 121 may also store notification preferences for mobile devices, receive notifications, and transmit notifications responsive to mobile device preferences. Thus, for example, when the transmitting device 101 starts and/or stops streaming data to the agency service 115, the management server 121 may transmit one or more notifications to viewing devices 105 and/or the transmitting device 101 responsive to the preferences. Notifications preferences stored at the management server 121 may indicate whether a user prefers to receive in-application, email, SMS, or multiple types of notifications. Additionally, the management server 121 may store preferences for one or more of the analysis processes described above, and which may be performed on received audio and visual data. Further, the management server 121 may transmit instructions and/or implements rules associated with commands received during a streaming session. For example, the management server 121 may process one or more received balancing commands from viewing devices 105 and forward the command onto a transmitting device 101, according to various embodiments. In some embodiments, the stream storage 121 may receive rules for processing commands from the management server 121 and transmit commands.

As outlined above, the agency service 115 manages streaming operations, and additional ways in which the agency service 115 performs these operations will become readily apparent in view of the remainder of the disclosure. For example, specific data received and/or transmitted by the agency service 115 in association with streaming operations is described in greater detail below and especially with reference to FIG. 2, which describes the data transmitted and/or received by BWC applications 141 that flows through the agency service 115.

In an embodiment, the viewing device 105 is a mobile device capable of collecting data and transmitting data (e.g., wirelessly) over network 120. In many instances, the viewing device 105 is a mobile device with telephonic capability, however, desktop devices such as personal computers are often utilized as dedicated viewing devices 105. The data transmissions over the network 120 may occur over one or more of a telephony network, telephony data network, and/or wireless internet connection such as WiFi. Some examples of a mobile device as a viewing device 105 include a mobile phone, tablet or notebook computer. Examples of dedicated viewing devices 105 include desktop or personal computers. Example embodiments of the viewing device 105 as a mobile telephonic device include feature phones and smart phones. Accordingly, a given mobile telephonic device or other device operated as a viewing device 105 may not necessarily include or support all of the functionality ascribed herein to the viewing device 105 or BWC application 141B function due to differences in device capabilities.

In one embodiment, the viewing device 105 executes a BWC application 141B to receive real-time video and/or audio data and/or receive notifications. The BWC application 141B may be downloaded to or otherwise provided to viewing device 105 and installed on the viewing device 105 to provide BWC application 141B functionality when executed. For example, the BWC application 141B may provide functionality to receive live video and/or audio streams, receive completed video and/or audio streams, and receive and/or transmit notifications about live and/or completed video and/or audio streams.

The BWC application 141B may interface with one or more display and/or audio playback devices to display notifications, display available audio/visual streams, and playback received audio/visual streams. The BWC application 141B may interface with a network interface of the viewing device 105 to receive and/or transmit notifications, receive listings of available audio/visual streams, and request streaming of an audio/visual data over the network 120 from the agency service 115. In one embodiment, the audio/visual data is a video comprising image and audio data. In some embodiments, the audio/visual data is received on independent streams, in which case the BWC application 141B may synchronize the audio and video streams based on one or more timestamps for synchronized playback. In some embodiments, these independent streams may be encapsulated in a single stream, such as by the encapsulation of independent audio, visual, and/or data streams in independent channels. In one embodiment, WebRTC encapsulates independent streams in a single multimedia stream.

The BWC application 141B may interface with a native sharing feature (e.g., a sharing feature of the operating system) of the viewing device 105 to transmit and/or receive one or more notifications (e.g., to/from agency service 115). Alternatively, the BWC application 141B may handle notifications separately or in addition to a native sharing feature. In either instance, the BWC application 141B may provide options to configure notification settings for receiving one or more notifications when a mobile device (e.g., transmitting device 101) streams audio/visual data to the agency service 115.

An example embodiment of a BWC application 141 providing functionality for receiving live video and/or audio data is described in more detail with reference to FIG. 2.

As used herein, the term "application" or "module" refers to computer program instructions and/or other logic used to provide the specified functionality. Thus, an application or a module can be implemented in hardware, firmware, and/or software. In one embodiment, program modules or application are formed of executable computer program instructions stored on a non-transitory storage device or computer readable storage medium, loaded into memory, and executed by a computer processor as one or more processes.

As used herein, the terms "message," "messaging," and "short messaging service (SMS)" each comprise the breadth of messaging services and related technologies or standards used for communicating and transmitting data over a network. These technologies and services include SMS messages, multimedia messaging service "MMS" messages, proprietary messaging service messages such as BLACKBERRY messages "BBM," Apple iMessages, and the like.

Example BWC Application

Figure 2:
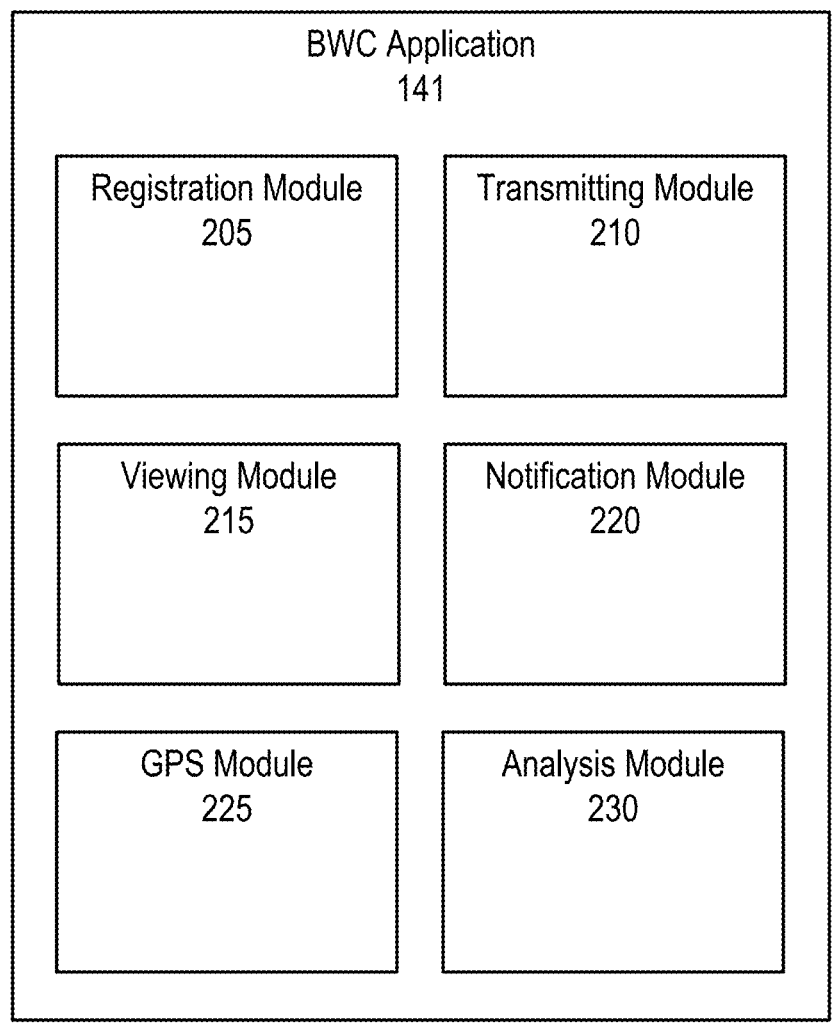
FIG. 2 is a block diagram illustrating example modules of a BWC application for configuring an existing work and/or device such as a mobile telephonic device to receive and/or transmit live video and/or audio data streams, according to an example embodiment.

FIG. 2 is a block diagram illustrating example modules of a BWC application 141 for configuring an existing work and/or device such as a mobile telephonic device to receive and/or transmit live video and/or audio data streams, according to an example embodiment. For example, the BWC application 141 may comprise one or more modules to receive and/or transmit live video and/or audio data streams and may incorporate all or only some of the modules and features described herein. For example, a BWC application 141 may be configured for transmitting (e.g., BWC application 141A of FIG. 1), viewing (e.g., BWC application 141B of FIG. 1), or both as is described below with reference to FIG. 2. In some embodiments, the functions are distributed among the modules in a different manner than described herein. Other embodiments have fewer, additional, other modules, and/or module functions may depend on device specific capabilities.

The BWC application 141 may be downloaded from the agency service 115 to a device and executed on the mobile device to facilitate transmitting and/or viewing operations. In other instances the BWC application 141 may be installed directly to a device or downloaded from a $3^{rd}$ party application store. Example devices (e.g., transmitting device 101 and viewing device 105) are described with reference to FIG. 1. As shown in FIG. 2, the BWC application 141 itself includes multiple modules. The BCW application 141 and one or more of the modules described herein may interface with components, modules, and/or devices of the device to which the BWC application 141 is installed. For example, the BWC application 141 and one or more of its modules may interface with software modules (e.g., operating system features), components such as image capture devices, audio capture devices, graphics display devices, global positioning devices, network interface devices, input devices, peripheral devices and so on, as described herein and with reference to FIG. 4, to transmit, receive, collect, store, and/or otherwise manipulate data on the device in accordance with their corresponding functions. In various embodiments, the device is a mobile telephonic device of a law enforcement officer. In the embodiment shown in FIG. 2, the BWC application 141 includes a registration module 205, transmitting module 210, viewing module 215, notification module 220, GPS module 225, and analysis module 230.

Registration

The registration module 205 interfaces with the agency service 115 to register a device having installed the BWC application 141 and/or user with the agency service 115. The registration module 205 may execute upon installation of the BWC application 141 and/or upon launch of the BWC application 141 after installation. The registration module 205 may transmit, to the agency service 115, detected device information, such as, Device Number, Service Provider, Country, Make/Model of Phone, IMEI, OS Version, etc. IMEI or International Mobile Equipment Identity is a unique number given to every single mobile phone, typically found behind the battery. IMEI numbers of cellular phones connected to a cellular network are stored in a database (EIR—Equipment Identity Register) containing all valid mobile phone equipment. The number consists of four groups that may be formatted: nnnnnn--nn-nnnnnn-n. The first set of numbers is the type approval code (TAC). The first two digits represent the country code. The rest make up the final assembly code. The second group of numbers identifies the manufacturer. The third set is the serial number and the last single digit is an additional number (usually 0). In some embodiments, the registration module 205 receives any device specific updates or features from the agency service 115 or other source based on the provided information and performs an update of the BWS application 141 to enable device specific features.

For user registration, the registration module 205 may generate a prompt requesting the user enter his or her email. The prompt may include instructions for law enforcement and/or other first responders to enter a work email. For example, a user may enter JoeSmith@usdoj.gov (not a personal email, such as JaneSmith@gmail.com). The registration module 205 transmits a registration request including the entered email address to the agency service, which receives and processes the registration request.

The registration module 205 receives a notification indicating the approval or denial of the registration request from the agency service. In response to receiving an approval notification, the registration module 205 prompts the user to provide account information such as a password and optionally provide additional account information (e.g., name/nickname, department, location, etc.). The registration module 205 transmits the provided account information to the agency service, which stores the received account information to complete creation of the user account. In response to receiving a denial notification, the registration module 205 may display a notification indicating the reason for the denial, e.g., "Email Address Not Confirmed," "Personal Email Accounts Not Allowed," etc. as received from the agency service and does not prompt the user to provide account information. In some embodiments where access and/or certain features are restricted to law enforcement officer and/or first responders, if the user confirms the email address, but the domain of the email is unknown to the agency service, the registration module 205 may receive a pending review notification. In response to receive a pending review notification, the registration module 205 may display a notification indicating that the registration request is pending review and not prompt the user to provide account information until receiving an approval notification from the agency service.

In some embodiments, rather than using real names or usernames (such as, "Your friend Joe Smith is live," or, "@joesmith is live") for stream identifiers, the BWC application 141 and/or agency service utilizes channel numbers to identify one or more streams. Channel numbers are easily recognizable to law enforcement officers and other first responders as they are similar to radio frequencies. For example, the format ###.## (example: 205.10) may be utilized to uniquely identify a channel number on which a transmitted stream is broadcasted on and thus also where another user (if authorized) may view the stream. The registration module 205 may receive an assigned channel number for the device or user from the agency service upon completion of user registration. Additionally, the registration module 205 may receive a list of channels which the device or user is permitted to transmit on and/or view. In turn, when the user completes registration or otherwise logs in (e.g., username-password combination, device authentication, and/or utilization of a guest code), the registration module 205 may display availability of one or more options in a registered user interface for selection based on the privileges of the device and/or user (e.g., as provided by the agency service). For example, the registration module 205 may display a registered user interface for the user to make a selection to start transmitting a stream (e.g., "Go Live") via the transmitting module 210, view a stream (e.g., "Tune In") via the viewing module 215, sign out, and/or access a settings menu to view, update or otherwise configure registration information and/or channel number information. An example registered user interface is explained in greater detail with reference to FIG. 3A.

In one embodiment, unpaid users of the BWC application 141 may be randomly assigned higher number channels, such as 935.42 that may change each time the BWC application 141 is launched. In one embodiment, paid users choose or are assigned fixed channel numbers (known as "Dedicated Broadcast Channels"), such as 100.50, that remain unchanged for convenience and memorability. In addition, paid users may be provided a list of additional channel numbers on which they are permitted to stream (e.g., a department channel, event or task specific channel within the department, etc.).

Additionally, the first set of X numbers (e.g., in a "XXX.YY" format) may be set based on the department and/or area of operation of an officer. For example, 101.## may correspond to a local police department in Texas, 102.## to a county sheriff's department in Texas, 110.## to the Texas state troopers, and so on. While the example the numbering system ###.## is limited to 100,000 permutations, it may be expanded to include one or more additional digits (e.g., ####.##, ###.###, ####.### etc. as desired), incorporate alphanumeric combinations or utilize a different format entirely to enlarge the pool of available channel numbers as needed. In some embodiments, multiple officers may utilize a same channel number where streams broadcast on the same channel number may be identified individually based on an officer badge number or other indicator.

In some instances, a law enforcement officer or other first responder may want to extend live streaming capability provided by the BWC application 141 to someone from the public (such as a witness, victim or cooperating informant) who otherwise may not be permitted access to the BWC application 141 and/or streaming function. For example, the BWC application 141 may be restricted to law enforcement and/or first responder use only, or the public may be allowed to utilize the BWC application 141 in a restricted fashion (e.g., restricted to live viewing and/or access to public broadcasts only) under normal circumstances. As a result, other individual's requests for account registration may be denied due to their lack of possessing a valid law enforcement or other approved email. The registration module 205 may provide a selectable option for guest mode (e.g., within a settings menu) which an officer may select while signed into the BWC application 141 on their mobile device. In response to selection of the guest mode option, the registration module 205 may generate a 9-digit Guest Code (such as 906-182-438) that is subsequently displayed. In some embodiments, the registration module 205 requests a guest code from the agency service. The registration module 205 may display a guest code returned by the agency service to be provided to a non-law enforcement user (e.g., a civilian). In some embodiments, the agency service may transmit the guest code (e.g., via SMS message) based on device information (e.g., a mobile telephone number) provided for a civilian in the request, optionally along with a link to download the BWC application 141. In turn, the civilian may be permitted to download the BWC application 141 and/or complete registration (e.g., temporarily) utilizing the guest code.

In some embodiments, the registration module 205 displays an option to enter a guest code to permit an otherwise non-authorized user access to the BWC application 141 and/or one or more features that otherwise would be restricted for that user. In embodiments where public users are allowed access but certain subsets of features are restricted, guest mode may afford public users access to additional features. For example, when a civilian requests access with a guest code, the registration module 215 may transmit the guest code to the agency service for approval or denial. In turn, the registration module 205 may receive an approval that indicates one or more features the guest code permits the user to access. For example, the approval for the guest code may indicate that the user is permitted with the ability to transmit (e.g., Go Live) but not view (e.g., Tune In) to other streams. In some embodiments, the guest code may permit the user to view a specific subset of channels, in which case when BWC application 141 requests a list of channels the agency service only returns the subset and may further restrict viewing to specific historical broadcasts (e.g., if an officer wants the user utilizing the guest code to view a specific broadcast for identification of a suspect or other). Additionally, in some example configurations, when a user permitted to transmit with a guest code is actively streaming, the issuer of the guest code (e.g., the officer) may be denied the ability to stream at the same time (or if the officer begins transmitting the stream permitted with the guest code is aborted). In some embodiments, the guest code expires after a set and/or configurable period of time (e.g., 4 hours, 24 hours, etc.) up to a set maximum period of time (e.g., 24 hours, 48 hours, etc.). After expiration, the registration module 205 and/or agency service revoke the privileges afforded by the guest code from the user. Further, device information transmitted along with the guest code allows the agency service to restrict usage of a given guest code to single use on a single device. This configuration can prevent the sharing of a single account between two officers rather than using the BWC application 141 as intended.

Transmitting

The transmitting module 210 interfaces with the device having installed the BWC application 141 to capture audio/visual data and transmit the audio/visual data to the agency service. For example, the transmitting module 210 may interface with one or more image capture devices of the device and/or one or more microphones of the device to collect visual and/or audio data for transmission over a network interface of the device.

In some embodiments, the transmitting module 210 interfaces with external audio/visual input sources. For example, the transmitting module 210 may interface with a remote image capture device and/or microphone over a wireless and/or wired connection. The remote image capture device and/or microphone may be attached to an officer as would be the case with a traditional body camera, an object such as a bicycle, or anything else as desired within reach of a wire or wireless connectivity range. For example, an officer may clip a small remote camera and/or microphone to his or her uniform which can be selected as the input device(s) for audio and/or visual data capture by the transmitting module 210. In turn, as the transmitting module 210 retrieves visual and/or audio data from the remote device(s) (when selected) rather than onboard devices of the officer's device, the officer may conveniently stow his/her mobile device (e.g., in a pocket).

In some embodiments, the transmitting module 210 interfaces with network accessible Cameras (e.g., IP cameras), such as those used for home security and monitoring city street corners over a wireless and/or wired connection. The interface with an IP camera may allow the transmitting module 210 to collect visual and/or audio data from the IP camera for transmission over the network interface of the device. The IP camera device may be located proximate to the device running the BWC application 141 on a same local network or the two devices may be remotely located, in either case the BWC application 141 ingests the IP camera stream and the transmitting module 210 transmits the stream to the agency service.

As outlined above, the transmitting module 210 captures audio/visual data for transmission to the agency service. The transmitting module 210 may transmit the audio/visual data along with an identifier (e.g., a channel number) to facilitate categorization of audio/visual data by the agency service. In other embodiments, the agency service may automatically categorize received audio/visual data (e.g., by assigned channel). In some embodiments, the transmitting module 210 retrieves or receives a broadcasting channel number identifier and/or listing of broadcasting channel number identifiers from the agency service on which the user is permitted to stream captured audio/visual data. In turn, the transmitting module 210 may display the list of available channel number(s) for user selection and optionally default to a particular channel number. The transmitting module 210 displays the assigned and/or otherwise available channel number(s) to the user and may receive a channel selection or channel number input from the user for streaming.

The transmitting module 210 may generate a transmitting interface for displaying a preview of and/or captured audio/visual data for transmission. For example, when the transmitting module 210 is activated such as by the user selecting the "Go Live" option from a user interface, the transmitting module 210 displays a live camera preview from an image capture device on the device, such as video from a rear or forward facing camera of the device, or video from an external camera.

The transmitting interface generated by the transmitting module 210 may display an option to start/stop streaming of audio/visual data. The user interface element for the displaying the option to start/stop steaming may visually and/or textually indicate whether the transmitting module 210 is actively capturing and streaming data (e.g., "stop stream," stop icon, first displayed color, etc.) or awaiting user input to start streaming data (e.g., "start stream," start icon, second displayed color, etc.). Thus, a user may toggle the user interface element to cause the transmitting module 210 to start or stop the transmitting of captured audio/visual data to the agency service.

When the user interface element is toggled to cause the transmitting module 210 to stream captured audio/visual data to the agency service, the video preview display corresponds to the captured video data which the transmitting module 210 begins streaming. Additionally, it may cause the transmitting module 210 to capture audio data from a microphone of the device or an external microphone configured to capture audio data, which the transmitting module 210 begins streaming to the agency service. Thus, the transmitting module 210 may stream captured audio and/or visual data to the agency service in response to user selection to start streaming and cease streaming in response to user selection to stop streaming. The interface may display additional information and/or options such as a channel number on which captured audio/visual data is to be or is being transmitted, switch capture input device, conceal, invite viewer, balance, number of viewers, a connection status, menu option for channel selection and/or other configuration (e.g., of capture devices), etc. An example transmitting interface is explained in greater detail with reference to FIG. 3B.

In some embodiments, the user may select the invite viewer option within the transmitting interface to invite other users to view a steam of the captured audio/visual data.

In one example embodiment, selection of the invite button causes the transmitting module 205 to launch a native sharing tray of the device (e.g., a sharing module native to the operating system of the device) that presents one or more options to share a tune-in shortcut to a contact via SMS, Facebook, Email, Slack, Skype, etc. For example, within the native sharing tray an officer may tap SMS, enter a recipient's phone number or select a recipient contact from a directory to transmit the tune-in shortcut via SMS. In turn, the selected recipient receives an invitation link to tune-in to the channel the transmitting module 210 is streaming or set to stream on. Selection of the link by the recipient may either launch the BWC application 141 on the viewer's device immediately or prompt the viewer to download the BWC application 141 if not already installed. A user may invite other users prior to and/or during steaming and toggle the start/stop user interface element as desired to begin and cease streaming via the transmitting module 210.

Hardware cameras are typically engineered with large storage capacities, capable of holding a full day of video or more. Given that this potentially large amount of storage cannot transfer to an agency's digital storage repository quickly, officers typically "dock" hardware cameras to form a physical connection for data transfer, just as one would plug in an external hard drive. In an embodiments, the BWC application 141 differs in that its primary method of storage is not on the device itself, but rather the audio/visual data stream sent from the transmitting module 210 in stored in stream storage (e.g., a cloud storage server or other network accessible storage service). Rather than recording audio/visual data to the device, such as a telephonic device, and then transferring one or more files to the agency service, the transmitting module 210 streams the audio/visual data to the agency service and/or stream storage. Either or both of which may be configured through a cloud provider (such as Amazon Web Services, "AWS") and/or other server system to store audio/visual data streams as they are received from the transmitting module 210. Accordingly, at the conclusion of streaming, the transmitting module 210 may ensure neither the transmitting device nor the recording device (or a mobile telephonic device performing both operations) possesses a copy of the audio/visual data streamed.

The above is important for two reasons: first, large video files are not consuming storage space on the device on which the BWC application 141 is installed, and second, the device is less likely to become part of the legal discovery process. If, for example, an officer used his personal mobile telephonic device to record a video of an interaction with a citizen, and that citizen decided to press charges, the mobile telephonic device may be confiscated and searched as part of discovery. Officers are fearful of this process, as text messages, photos and other communications outside of the citizen interaction may be discovered and be used to question an officer's character. As the transmitting module 210 streams captured audio/visual data to the agency service and ensures captured audio/visual data does not live on the device itself longer than necessary, solid ground is provided for refusing any request to turn over the device. Instead, counsel can be instructed to request the pertinent stream(s), which are maintained in the stream storage, from the agency service or otherwise provided the stream(s).

In another example embodiment, the transmitting module 210 may temporarily store captured audio/visual data on the device itself. For example, the transmitting module 210 may simultaneously stream and store captured audio/visual data. In some cases, the transmitting module 210 may only store one or both of captured audio and/or visual data dependent on a network connection. Officers utilizing devices with high storage capacity may opt for this method, as the local copy of the recording may be of a higher quality than the version streamed to the agency service.

In some embodiments, the transmitting module 210 monitors a quality of network conditions (e.g., available bandwidth, latency, etc.) between the device and the agency service prior to and/or throughout the streaming process. For example, if the transmitting module 210 detects that the quality of network conditions is poor or deteriorating, the transmitting module 210 may stream a compressed (lower-resolution) version of audio/visual data while storing a full (uncompressed) quality version, as local storage is not subject to bandwidth limitations. In some embodiments, the transmitting module 210 compresses (e.g., lowers the resolution) of the visual (e.g., video images) data only as video image data consumes far more bandwidth than audio data. In the case of network conditions too poor to support the ability of the transmitting module 210 to even stream audio data, the transmitting module 210 may store audio data locally as well. In turn, the transmitting module 210 may detect when the quality of network conditions improve and resume streaming of audio and/or audio and video image data based on the quality of the network conditions (e.g., streaming of audio data may resume prior to resuming streaming of audio and visual data).

In this hybrid storage model, the version of the stream transmitted in real-time by the transmitting module 210 and stored by the stream storage may be available immediately for viewing by other users whereas the higher quality version (or portions thereof) stored locally would not be available for viewing by others until transmitted to the stream storage. To conserve bandwidth and/or data caps, the transmitting module 210 may wait for detection of a WiFi network connection to transmit the higher quality version (or portions thereof) to the stream storage. Further, to alleviate legal discovery concerns brought on by local storage, the transmitting module 210 may encrypt any audio/visual data to be stored locally on the device at the time of its capture. Thus, an officer or other party would be unable to tamper with the local audio/visual data stored by the transmitting module 210. In turn, the agency service may possess a key to decrypt encrypted data once the data is received at the stream storage to enable viewing. In this manner, while audio/visual data may temporarily reside on the device of an officer, it cannot be viewed or tampered to afford protection from discovery.

Oftentimes, only a small segment (e.g., a portion) of the audio/visual data captured by the transmitting module 210 during a stream is of critical importance. If that segment of critical importance occurred during a period where a quality of network conditions is poor, stream quality may be too poor to make out a person's face or a license plate. Recall, if the entirety of collected video data is stored on the device of an officer as a high quality version, the device may lack the necessary storage to store video for the full duration of a stream in high quality. Additionally, if the duration of the stream is long, even if the device can physically store the full duration of the stream in high quality, a time and/or data cap allowance required to transfer the complete broadcast may be excessive.

In some embodiments, the transmitting module 210 includes a balancing option (e.g., within a menu) that may be enabled and selectively triggered (e.g., within the menu, a transmitting interface, and/or hardware button) to cause the transmitting module 210 to locally store a segment of collected audio/visual data in high quality. Otherwise, while the balancing option is enabled, the transmitting module 210 streams collected audio/visual responsive to a quality of network conditions (which may result in some instances of local video and/or audio storage, but image quality may be reduced from highest quality unless balancing is triggered). In practice, a user may trigger balancing to cause the transmitting module 210 to locally store a high quality version of collected audio and/or visual data while streaming, in parallel, a lower quality version of the collected audio and/or visual data to the agency service. In an example embodiment, the transmitting module 210 may receive triggers for balancing responsive to user input on the device and/or from the agency service (e.g., by way of a viewer of the stream).

Once the transmitting module 210 receives a balance start trigger, the transmitting module 210 begins local storage of a segment of collected visual image data in high quality and optionally with a corresponding audio segment until a balance stop trigger is received. In some embodiments, the transmitting module 210 may limit a duration of a segment to a set period of time, such as 10, 30, 60, 120 seconds or other period of time. Upon reaching the end of the set period of time without having received a balance stop trigger, the transmitting module 210 may cease to locally store collected audio/visual data to complete the segment. Limiting segment duration to a set period of time minimizes file size of segments for transmission to the agency service. The transmitting module 210 may encrypt locally stored segment data as described previously. At the conclusion of a stream or otherwise as network conditions permit, the transmitting module 210 may transmit one or more locally stored segments to the agency service. This may happen immediately or the transmitting module 210 may wait for detection of a WiFi connection to transmit the one or more locally stored segments.

Unlike a live stream of a sporting event, where seeing a touchdown ten seconds after it occurred on the field does not impact consumer viewing experience, time-delay in the field of law enforcement is a major concern for officer safety. For example, if a viewer sees or hears a suspect pulling a gun on an officer that is streaming a traffic stop, a delay in providing backup could result in injury or death. In some embodiments, the transmitting module 210 mitigates time-delay in streams by transmitting independent audio and video streams over a same network connection, and giving priority to the audio stream. Thus, for example, when the transmitting module 210 collects audio/visual data to stream to the agency service, the collected audio data may be streamed in parallel to collected video image data stream. Similarly, data associated with the stream may be also streamed in parallel to collected video image data and audio data streams. In some embodiments, the stream for associated data is bi-directional, thusly enabling the transmitting module 210 to receive data from the agency service, which may include one or more commands (e.g., balance), alerts, viewer count notifications, chat data, GPS data, time stamps for the data, etc. as applicable.

As such, the transmitting module 210 may stream video comprising image data and audio comprising audio data separately (e.g., as independent streams) in real-time via the network interface to the agency service. The transmitting module 210 may encapsulated the separate, independent streams within in a single multimedia stream configured to provide an independent channel for each stream (e.g., respective channels for respective streams). For example, these independent streams may be encapsulated in a single stream, such as by the encapsulation of independent audio, visual, and/or data stream each on an independent channel. In one embodiment, WebRTC encapsulates independent streams in a single multimedia stream.

The transmitting module 210 may generate time stamps for each stream based on a current time of the device to ensure that the audio data stream and video image data stream may be synchronized (e.g., at the agency service) for storage and/or viewing. As network conditions may affect data transfer rates and/or loss of streamed data (e.g., packet loss), the agency service may drop one or more video frames during real-time streaming to viewers to keep the video stream synchronized with the audio stream. Viewing historical streams does not necessitate frame dropping to maintain real-timeliness of the stream, however, the time stamps allow the agency service to synchronize and/or merge the audio stream and video stream for subsequent viewing.

The transmitting module 210 may also take action in response to a quality of network conditions (e.g., bandwidth, throughput, etc.) to reduce packet loss and buffering delays that can impact real-time viewers. As such, in instances where the transmitting module 210 detects that a quality of network conditions deteriorate, rather than buffer a steam containing audio and visual data, the transmitting module 210 may adjust a data rate (e.g., a quality) of each stream individually to adjust a percentage of bandwidth consumption allowed for each stream in a prioritized fashion. In turn, the independent streams, subject to adjustment as described herein, may be encapsulated within in a single multimedia stream. The independence of the streams that are encapsulated within the single multimedia stream enables their adjustment because they are treated as separate, independent channels.

For example, as available bandwidth decreases due to a decrease in quality of network conditions, the transmitting module 210 may increase a percentage of the available bandwidth allocated to the audio stream and decrease a percentage of the available bandwidth allocated to the video stream in order to prioritize audio streaming. Accordingly, as available bandwidth decreases (e.g., to 1 Mbps) and the percentage of the available bandwidth allocated to the video stream is decreased (e.g., to 60%), the transmitting module 210 may reduce video quality (e.g., from high quality down to no video) by reducing a data rate of the video stream based on an amount of allocated bandwidth available for the video stream (e.g., 0.60 Mbps). If available bandwidth decreases below a video cutoff threshold (e.g., below 0.8 Mbps), the transmitting module 210 may cease video streaming to allocate all available bandwidth to the audio stream to maintain acceptable audio stream data rates (e.g., above 0.128 Mbps, or otherwise depending on encoding) and resume video streaming when available bandwidth increase above the threshold. As available bandwidth increases (e.g., to 3 Mbps), the transmitting module 210 may increase video quality (e.g., from no video to high quality) by increasing a data rate of the video stream based on the amount of allocated bandwidth available for the video stream (e.g., 60% of 3 Mbps, or 1.8 Mbps).

Further, as available bandwidth increases (e.g., to 3 Mbps), the transmitting module 210 may decrease a percentage of the available bandwidth allocated to the audio stream and increase a percentage of the available bandwidth allocated to the video stream when an amount of allocated bandwidth available for the audio stream if not in video cutoff reaches a threshold (e.g., 0.5-8 Mbps, depending on encoding) allowing for high quality audio streaming (e.g., at 0.320 Mbps, depending on encoding).

As mentioned previously, the transmitting module 210 may locally store audio and/or visual data. Accordingly, if available bandwidth decreases to a point at which the transmitting module 210 cannot reliably stream audio data, the transmitting module 210 may locally store audio data in addition to the video data. In such instances, the audio data and video data may be stored separately or as a single video file with audio for later transmission to the agency service. In some embodiments, the transmitting module 210 locally stores video stream data in response to the amount of allocated bandwidth available for the video stream falling below the video cutoff threshold or when the amount of allocated bandwidth available for the video stream falls below a video quality threshold, which may be greater (e.g., 1.2 Mbps) than the video cutoff threshold (e.g., 0.8 Mbps). The local storage of audio and/or visual data and transmission to the agency service may be handled as described previously.

The result is a real-time experience for viewers of audio/visual data streamed by the transmitting module 210 as audio data stream quality may be prioritized and remain high while video stream data remains in sync but may fluctuate in quality based on the quality of the network conditions experienced by the device. In some example embodiments, the transmitting module 210 may be configured to maintain a certain video quality level, permitting buffering delays in streamed video data to maintain a higher video quality than would otherwise be possible under a given quality of network conditions. This mode may be selected (e.g., via an option within a menu of transmitting interface generated by the transmitting module 210) when the average quality of a video stream without utilizing local storage is more important than a real-time experience for viewers, or when real-time viewing of the stream is not anticipated.

In some embodiments, the transmitting module 210 is utilized to take video in a public or potentially dangerous area where the user (e.g., an officer) wishes to conceal the fact that video and/or audio are being captured. Or, the officer may attach the device executing the BWC application 141 to a vehicle mount (like an Uber/Lyft driver) to utilize the BWC application in a fashion similar to a dash camera where the display of captured image data could present a dangerous distraction. The transmitting module 210 may display a conceal option within the transmitting interface to toggle a conceal selection, or otherwise detect input from a hardware button set to toggle the conceal selection at any time during streaming. In response to receiving a conceal selection while displaying a preview of live video capture, the transmitting module 210 disables the live video capture preview. In response to receiving a conceal selection while live video capture preview is disabled, the transmitting module 210 may resume display of the preview of captured video. In some embodiments, while video capture preview is disabled, the transmitting module 210 generates an interface mimicking a common mobile device interface, such as a lock screen. For example, the transmitting module 210 may generate an interface display a discreet dynamic image such as a black background with a large digital clock (a common lock-screen appearance). Concurrently, while the live camera preview is disabled in response to a conceal selection, the transmitting module 210 continues to capture and stream audio/visual data to the agency service.

In some embodiments, the transmitting module 210 may detect user input (e.g., a press and hold on an area of the mimicked interface) to "Peek" at the video preview. In response, the transmitting module 210 may fully or partially reveal the video preview. In some example embodiments, a partial reveal comprises the display of a half-opacity/ghost preview of the live video, while overlaying the mimicked interface as a concealment layer. In either instance, the transmitting module 210 detects user input indicating the peek and fully or partially displays the video preview allowing an officer to temporarily preview (e.g., while the input is actively detected) captured video (e.g., so that the officer is certain an appropriate image capture device is selected and/or pointed in the desired direction). The mimicked interface may utilize multiple concealment layers, similar to "filters" in popular photo-sharing applications. In some embodiments, an officer may swipe right or left to cause the transmitting module 210 to cycle between different concealment layers, examples of which may include a digital clock, map image (appearing that the user is navigating), current weather, or any other common screen image unrelated to video capture.

In some embodiments, an officer may password protect one or more streams transmitted by the transmitting module 210. For example, a menu of the transmitting interface generated by the transmitting module 210 may provide one or more options for an officer to protect stream(s) with a password. Selection of the password option may be applied on a per-stream basis or channel basis. Thus, for example, an officer may password protect their assigned channel and/or password protect an individual stream on their assigned channel or other channel which the transmitting module 210 streams on. Passwords may be automatically generated from a random selection of passwords or specified by the officer. An example of a generated channel may be a simple combination of a color and animal (e.g., "bluegoose" or other combination readily communicable. In addition, when the officer invites a viewer through the transmitting interface the channel and/or stream password may be communicated to the recipient (e.g., "tune In to Channel 100.50 using password bluegoose").

In some embodiments, the transmitting module 210 is not limited to single lens visual image capture and can support input from multiple image capture devices for a same broadcast stream. These input capture devices may include but are not limited to stereo, stereoscopic, panoramic, 360 and 3D cameras. Example image capture devices of this type may afford a greater range of vision in a single frame, enabling an officer to capture not only what is in front of them (e.g., in front of a typical mobile device running a BWC application and having a more typical image capture device), but objects that appear above, below, and behind. Playback of stereoscopic and other multi-camera captured video data can be performed in a traditional video player and/or other video player (e.g., like viewing module 215) that may allow users to click and drag or rotate their phones to navigate the field of vision. Alternatively, accessory devices such as Google Cardboard, Samsung Gear VR and Oculus Rift provide immersive experiences for exploring a video through goggles by simply rotating one's head to change the field of vision. Stereoscopic video capture may be of added importance for the field of law enforcement, as chief objections to traditional BWCs are that they pick up a limited field of view that does not capture important details of a situation. For example, if a suspect was running at an officer from behind with a knife, traditional BWCs would fail to capture image data of the suspect. Utilizing a 360 Camera mounted in an optimal location such as on the shoulder, head, or atop a police vehicle and coupled to the device having installed the BWC application 141, the transmitting module 210 may capture and subsequently stream image data coving a wider field of vision, painting a more accurate account of events that transpired. The application based functionality can easily be updated to accommodate new advances in image capture devices that may be coupled to devices such as mobile telephonic device carried by law enforcement officers in the field and/or to devices such as laptop computers with network connectivity installed within police vehicles.

Viewing

The viewing module 215 interfaces with the device having installed the BWC application 141 to retrieve streams of audio/visual data, such as from an agency service, and playback the streams. For example, the viewing module 215 may interface with a network interface of the device to stream audio/visual data from the agency service. As described above, the agency service may receive one or more streams from devices utilizing a BWC application. In turn, the viewing module 215 may access a stream in real-time and/or view historical streams.

The viewing module 215 may request one or more channel numbers the user is permitted to view (e.g., by default, permissions by way of registration, channels for which the user has provided a current password, etc.) and display the available channel numbers within a menu of the viewing interface. Alternatively or in addition, the viewing module 215 may display an input field for the user to input a channel and optionally a password if the channel is password protected. In either instance, a channel (and optionally a password) are transmitted to the agency service responsive to user selection of a channel or input of a specific channel. Provided the agency service permits the user to access the channel (either through existing permissions or new permission by way of correct channel/password combination), the viewing module 215 receives stream data for the channel (e.g., from the agency service).

Stream data received by the viewing module 215 for the channel may be real-time stream data, historical stream data, and/or a listing thereof. For example, the viewing module 210 may receive real-time stream data corresponding to a stream being broadcast in real-time (if applicable), historical stream data corresponding to a beginning of a last broadcast stream, and/or a listing of a real-time stream (if applicable) and historical streams available for viewing. In one example embodiment, the viewing module 215 automatically tunes-in to (e.g., receives) any real-time stream being currently broadcast on the channel or when a real-time stream begins on the channel. The viewing module 215 may automatically tune-in by opening a stream through the agency service and/or responsive to a received notification (such as a push notification). In some embodiments, the viewing module 215 may present an option to the user to tune-in to a real-time stream temporally proximate to the start of the real-time stream in response to the receipt of a notification (e.g., alerting the user to the start of a real-time steam on the channel the user may be currently tuned into or any channel or stream the user is permitted access).

Depending on the embodiment, the viewing module 215 may receive a multimedia stream encapsulating video comprising image data and audio comprising audio data separately (e.g., as independent streams) in real-time via the network interface from the agency service. In one embodiment, WebRTC encapsulates independent streams in a single multimedia stream. Additionally, the multimedia stream may also encapsulate a data stream from which the viewing module 215 may receive viewer count, chat data, GPS data, and other data associated with the steam as discussed herein. In some embodiments, the data stream is bi-directional, such that the viewing module 215 may transmit distress alerts, balance commands, chat data, and other data associate with the stream as discussed herein back to the agency service in substantially real-time. In turn, the agency service may provide that data to the device that is transmitting and/or other viewers. For example, the agency service may forward a balance command to a transmitter and chat data to the transmitter and/or other viewers in substantially real-time.

By way of example, the process may occur as follows. A user may access the viewing module 215 by making a selection to tune-in (e.g., as opposed to start a stream). In turn, the user may input a channel and optionally a password to tune into a real-time stream on the channel. The viewing module 215 transmits the channel and corresponding password (if any) to the agency service. In turn, the agency service streams audio/visual data to the device, which the viewing module 215 displays within the viewing interface to the user. In one embodiment, users viewing real-time streams cannot be seen or heard by a user transmitting the stream, though the viewing module 215 and/or transmitting module 210 may receive updates to a viewer count to display within their respective interfaces. When a user has finished viewing a stream, s/he may select an option within the viewing interface to stop viewing the stream and view a different stream or access different functions of the BWC application.

Similar to embodiments of real-time streaming over independent streams, audio streams may be prioritized for viewers in a similar fashion. In the event of a complete interruption in network connection or inability to receive audio without buffering, the viewing module 215 may restart receipt of a real-time stream from a current time, allowing the user to miss what happened during the period of interruption, so that the user views audio/visual data in sync with the live broadcast.

In some embodiments, while displaying a real-time stream, the viewing module 215 transmits a balance trigger. For example, the viewing module 215 may transmit the balance trigger responsive a user selection with the viewing interface. The balance trigger causes the local storage of a high quality version of collected audio and/or visual data at the streaming device (i.e., another device utilizing the BWC application 141 to broadcast a live-stream) the user is viewing via the viewing module 215. By way of example, embodiments viewing module 215 generate a viewing interface with a selectable balance trigger option to allow the view to start/stop segment recording at the broadcasting device, such as by tapping and holding the screen or a button to start, then releasing to stop, which causes the viewing module 215 to transmit the balance trigger to the agency service and/or transmitting device. For example, the viewing module 215 may transmit a balance trigger to start and/or stop local storage of a segment at the transmitting device via a low-latency technology such as Web Sockets or WebRTC (e.g., over a data stream channel) so that the delay in a standard HTTP/TCP request does not cause the transmitting device to fail to locally store the first intended few seconds of a segment. As described previously, once a transmitting module 210 (e.g., of the transmitting device) receives the start instruction (e.g., the balance trigger to locally store a segment), captured audio and/or visual data for stream is also stored locally in high-resolution (e.g., a resolution greater than streamed resolution up to a maximum allowable by the image capture device) until a stop instruction (e.g., a subsequent balance trigger) is received or a specified time period for segment recording is reached (e.g., 30 seconds, 1 minute, 2 minutes, etc). A balancer trigger to stop local segment storage may be transmitted and received in a similar fashion to the start instructions.

In some embodiments, while the BWC application 141 is primarily configured for for one-way communication from a transmitting device to viewers, viewers with permission may be permitted to "Barge In" to a live-stream. The term Barge In refers to a viewer that temporarily becomes the transmitter/broadcaster (e.g., streams live within another live stream) for a brief period of time. For instance, if a viewer needs to urgently communicate something to an officer that is live-streaming, s/he may press and hold a barge in button or on the audio/visual data displayed within the viewing interface to temporarily cause the viewing module 215 to interface with the transmitting module 210 of the viewer's device to capture and stream audio/visual data to the agency service. The agency service, in turn, may seamlessly switch to the received stream from the viewer's device within the live-stream of another device such that other viewers and the transmitter on the channel temporaly receive audio/visual data from the viewing device that barged in. Additionally, the agency service transmits the barge in audio and video stream to the device that was streaming (e.g., the real-time stream that was barged in on). Similarly, the transmitting module 210 may call the viewing module 215 to temporarily display the audio/visual data received from the viewing device that barged in. Thus, similar to a walkie-talkie button, a viewer may select the option to cause the viewing module 215 to interface with the transmitting module 210 to Barge In to a live stream with viewer audio and video.

In some embodiments, the viewing module 215 generates a viewing interface with a chat option (e.g., as an alternative to barge in or when barge in is not allowed). Viewers may input text within the chat of the viewing interface and cause the viewing module 215 to submit the text to the chat, such as by transmitting the text to the agency service such that all participants in the chat receive the text data. Accordingly, viewers (and optionally a transmitter via a similarly configured chat within a transmitting interface) may communicate during a live-stream and/or within a channel. A common use-case is when an officer that is streaming in real-time poses a question over the stream, such as, "Can everyone hear and see me clearly?" and a chat response submitted by a viewer via the viewing module 215 comprises text such as "Yes" to be displayed both to viewers and transmitters (e.g., via chat within the respective interfaces). In some embodiments, viewers may toggle the visibility of each message to send to all participants, transmitter only, or viewers only. Chat messages may be displayed as an overlay to visual data within a viewing and/or transmitting interface, so that video image data is not obstructed, as a separate screen apart from the video image data, or in a split-screen fashion. Chat history may be stored by the agency service and made available for later download with the stream within which the chat occurred, and can be synchronized with the stream based on one or more timestamps associated with the stream and textual chat messages such that during playback of a historical stream chat messages are displayed relative to the point they occurred in the real-time stream.

As described previously, in a typical scenario, the user transmitting the stream is in control of when to start/stop live-streaming data on a channel. However, in some instances a user may wish to delegate that responsibility to a viewer, such as a supervisor. Accordingly, in some instances, a viewer having been delegated permission to start/stop a transmitting module 210 of another device may utilize the viewing module 215 to remotely start a stream of that other device. For example, the viewer may select from within a viewing interface generated by the viewing module 215 a device to instruct to begin a live-stream. The viewer can conversely stop a live-stream being transmitted by that device. The start and/or stop instructions may be transmitted in a fashion similar to the balance trigger (e.g., Web Sockets, etc.) Remote Start/Stop is beneficial in the field of law enforcement as video is often taken in a team/group scenario, where a viewer may wish to start a stream to capture audio/visual data on a particular device when the officer in possession of that device might not realize capture of audio/visual data is of value, or to stop a stream if the officer enters an area where recording is prohibited. To exercise better control over the feature (not allowing remote start/stop to occur at any time without warning, the BWC application 141 may include an interface and/or menu with a remote start/stop activation setting, may additionally include options for a user to delegate permissions for remote start/stop, and delegation and/or activation thereof may allow remote control for only a fixed time period, such as between 1-24 hours as desired.

In another embodiment, the recording is visible in a history tab/panel, such as within the viewing module 215 when a given channel is selected. Additionally, the agency service may provide a web portal for users to view and/or download historical streams (e.g., via the provided link), which a registered user may access with his/her existing BWC application 141 registration credentials (e.g., user name such as an email and password). Historical streams may be categorized and identified by channel number and/or officer Name/ID associated with the stream when it was originally broadcast. For example, an officer may sign in utilize the viewing module and/or web portal and see a list of three channels be transmitted over in the past (i.e. 970.23, 205.10, and 100.06). The officer clicks or taps the channel number, then is presented with a list of one or more broadcasts that took place on that channel for selection to view. Historical streams may be identified by a nickname (which may be auto-generated or specified by the officer), by Date/Time, File Size, Duration and other attributes such as iPhone or Android.

In some embodiments, the viewing module 215 includes an emergency distress alert option which a viewer may activate through the viewing interface if the viewer believes a user transmitting a stream in real-time is in danger, or otherwise needs to alert the user transmitting a stream. While Barge In could be utilized for two-way emergency communication, Barging In could incidentally increase risk (for example, if a criminal suspect is in earshot of the user that is transmitting). In some embodiments, the viewing module 215 addresses this concern by comprising a distress alert which a viewer may select to cause the viewing module 215 to transmit a request to alert a transmitting user. In one example embodiment, the agency service receives the distress alert request and relays the distress alert request to the device of the transmitting user. By way of example, receipt of a distress alert request at the device of the transmitting user may cause the BWC application on that device to effect a single vibration or series of rapid, pulsing vibrations and/or emit audio to alert the user. A viewing interface generated by the viewing module 215 may provide a selectable option for a viewer to request a distress alert by selecting the option within the interface. In turn, the viewing module 215 of the viewer transmits the selection of the distress alert request to the corresponding device transmitting the stream being viewed (which may pass through the agency service, depending on the embodiment). The nature of how a received distress alert causes a transmitting device to alert its user may be configured within a menu of the BWC application (e.g., within a menu of the transmitting module 210) so that a user (when they are streaming) can distinguish a received distress alert (caused by a viewer of the stream) from other notifications (such as incoming SMS). Configurations may include but are not limited to a single brief vibration, a sing long vibration, or a series of rapid vibrations or audio pings.

Notifications

While some streams may be scheduled with interested parties (for example, going live at 3:00 PM), many streams are unscheduled and inviting viewers through the transmitting and/or viewing interface each time a stream is broadcast by a particular user or on a particular channel may be cumbersome. Accordingly, in some embodiments, the BWC application 141 includes a notification module 220 to receive notifications and/or configuring notification preferences.

In an example embodiment, the notification module 220 includes one or more options for configuration of notification preferences. Notification preferences may include options to select channels for which the user would like to be notified when a stream is transmitted live on the channels. The notification module 220 transmits the notification preferences to the agency service. In turn, the agency service stores the preferences for the user and transmits one or more notifications to the notification module 220 (and/or other notification option such as SMS, email, etc.) responsive to the user's notification preferences. For example, the agency service may push a notification to the notification module 220 while the user is logged into the BWC application 141 when a stream is broadcast on a channel for which the user has selected to receive associated notifications or a stream is broadcast by a user for which the user has selected to receive associated notifications. In turn, the notification module 220 may generate a notification on the device of the user to notify the user as to the channel and/or user that is streaming live. Example notifications may be configured from push notification (e.g., handled by the notification module 220), SMS, E-mail, or combination thereof based on user preferences selected from within the notification module 220. A push notification handled by the notification module 220 may call the viewing module 215 responsive to user selection. E-mail and/or SMS notifications may include a link to open the BWC application 141 and tune into the channel for which the notification is associated with (e.g., based on a link). Thus, a user tapping or clicking a received notification may cause the device to open the BWC application 141 and the viewing module 215 to request the stream on the channel or by the user for which the notification was received.

In some embodiments, the notification module 220 may transmit notification in-app (e.g., push notifications) to other devices having configured a BWC application 141 and enabled notifications thereon. For example, the notification module 220 may provide an interface to input and/or select from registered user accounts (e.g., via email, phone number, or other user name) to transmit the notifications to in response to transmitting module 210 on the device beginning a stream. The notifications may flow through the agency service when configured to receive and transmit notifications according to stored user preferences received from users' respective devices. In some embodiments, the agency service may provide in-department user account identifiers to the notification module 220 of registered BWC application 141 users having registered with a same departmental email domain. Thus, for example, a BWC application 141 user having registered with JSmith@doj.gov may receive a list of doj.gov email addresses of other registered users from the agency service to select notification options in association therewith through a notification options interface generated by the notification module 220. As an example, the user may select a given user, e.g., "Jane Doe JDoe@doj.gov" and select an option that given user be notified when the user being a stream and the notification module 220 transmits the selection and preference to the agency service. As a result, when the BWC application 141 on J Smith's device "Goes Live" (e.g., J Smith streams via the transmitting module 210) or concludes a stream, the agency service may transmit a notification to Jane Doe based on J Smith's preferences, e.g., in application notification, email to "JDoe@doj.gov" or SMS at a phone number.

At the conclusion of a stream, the user having broadcast the stream and/or one or more viewers may wish to playback and review the captured audio/visual data. In one embodiment, the notification module 220 provides an option for a user to select to receive a notification indicating a location and/or identifier (such as a link or URL) of where to access viewed and/or transmitted streams after their conclusion. One or more notifications may be communicated by the agency service responsive to user preferences in a similar fashion to those described above. In some embodiments, notifications for concluded broadcasts include a link and/or URL to view the captured audio/visual data of the stream, which may be accessible via a web browsing interface and optionally password protected (e.g., by the channel password).

The BWC application 141 improves upon existing law enforcement video solutions by employing advanced notification (and thus sharing) capabilities. An individual officer may opt to share a single stream, all streams, or streams between a defined date range with one other officer, many officers, or all officers in the same unit or agency. Historical streams may be selected and shared, and options for sharing live-stream may be configured through the notification module 220, the desired recipient(s) receiving a notification of a stream to view. Streams may also be shared by way of a public link or password-protected link so that non-registered users are able to replay a stream which they have been given permission to view. Rather than transferring large video files to other users, permissions on the files are configured by way of user preference stored on the agency service such that other users are granted or denied access programmatically. Permissions may further define whether an officer can download or only playback a shared stream (e.g., with the viewing module 215 and/or via a web browser through a portal provided by the agency service). Additionally, officers may transfer ownership of a stream, set of streams, or channel to another user and/or administrator (e.g., of a department). All of which may be accompanied by notifications.

GPS Tracking

The GPS module 225 monitors device location (e.g., as determined through GPS signals and/or WiFi location identification on the device) and may append GPS data to transmissions from the BWC application 141 (and/or transmit GPS data separately with identification information for the device) to the agency service. The GPS module 225 may append or otherwise transmit GPS data in association with data transmitted (e.g., transmitting module 210) or being received (e.g., viewing module 215) by the BWC application 141. For example, the GPS module 225 may capture GPS data and append GPS data to or transmit GPS data in association with audio/visual data streamed by the transmitting module 210 to report location data while an officer is streaming. In one embodiment, the GPS data is encapsulated in a multimedia stream and transmitted in association with audio data and video data also encapsulated within the multimedia stream. In another example, the GPS module 225 may transmit GPS data (e.g., to the agency service) responsive to the viewing of a stream in real-time via the viewing module 215 such that a user who is streaming may be aware of the location of viewers of the stream (e.g., to ask for assistance and/or otherwise control viewer access to the stream).

The GPS module 225 may be enabled within the BWC application 141 to provide great situational awareness to both transmitters and/or viewers of a stream. For example, during a stream, the transmitter and/or viewers may opt (or otherwise be forced) to share their location, which may be a GPS location (e.g., in the case of a mobile device with a GPS unit) or a determined location based on a WiFi and/or wired network connection (e.g., as reported by a network device and/or ISP). The sharing of location with others allows a transmitter and/or viewer to visualize, for example, the street intersection where each viewing participant is connected from or where the transmitter is streaming from, respectively. GPS location display may be activated within respective transmitting and/or viewing interfaces generated by the respective modules within the BWC application 141. For example, within either interface a user may select a GPS button within the interface to toggle the display and/or appearance of reported GPS location data of the devices of the transmitter and/or viewers of a stream, such as by tapping the button, holding an area of the screen, entering a split-screen mode, or other interface configured to display location data. Displayed location data may visually distinguish transmitting device location from viewer location in the event both are displayed at the same time.

In one embodiment, in response to a selection to share location, and/or view location data, the GPS module 225 polls the GPS receiver of the device and/or interfaces with the network interface of the device to determine location coordinates. Location coordinates may either be sent directly to other participants and/or the agency service for storage and dissemination back out to other participants. In some embodiments, the GPS module 225 utilizes Web Sockets to transmit determined location data and/or appends determined location data to other data being transmitted (e.g., to the agency service). If stored by the agency service, location data as reported by one or more devices transmitting and/or viewing a stream may be available for download at a later date, or available for display alongside historical stream data being viewed. For example, audio/visual data streamed by an officer with the BWC application 141 may be replayed side-by-side with a map configured to display location data reported in association with the stream and, as such, one or more location marker(s) may be placed to represent and/or show a location of the officer throughout the stream based on corresponding time stamps between reported and/or appended GPS location data and stream data when it was originally captured.

Captured Audio/Visual Data Analysis

The analysis module 230 may perform one or more analysis operations on captured audio/visual data (e.g., by the transmitting module 210), according to example embodiments. For example, the analysis module 230 may perform analysis operations for facial detection, license plate detection, and/or speech detection. In some embodiments, one or more analysis module 230 functions are performed by the agency service to minimize processing at the device of a user (e.g., to minimize battery drain and/or device slowdown). Thus, for example, embodiments of the agency service may include an analysis module to perform one or more of the processes below on received streams. The independence of streams encapsulated within a single multimedia stream may allow the agency service to process data in a similar fashion, although some aspects such as facial image and/or license plate image detection and collection of a high-quality image thereof may preferably be performed on the user device dependent on a current available bandwidth (e.g., when visual image data stream received by the agency service is of much lower quality than captured visual data on the device). As such, where an analysis module function is performed may be specific to the circumstances or implementation preferences of a given embodiment, or some aspects are preferably done by the user device (e.g., facial image/license plate detection and capture in high quality) and other are preferably done by the agency service (e.g., speech recognition and text-to-speech translations) in a given embodiment.

In some instances, the purpose of conducting a stream broadcast with the BWC application 141 on a device is to capture the face or faces of suspects, such as persons of interest in an undercover meeting. In these cases, a high-quality image of the suspect is of critical importance. To obtain this clear picture without the storage burden of recording the entire session at high-quality, the analysis module 230 may analyze captured visual image data to detect human faces within the captured image data. In response to detecting a human face within captured visual image data, the analysis module 230 may locally store one or more frames from the visual image data and/or otherwise capture an image or series of images for local storage in high-quality. In some embodiments, the analysis module 230 collects a series of images and/or frames at quick intervals for local storage in response to the detection of a human face. Images or frames and/or series thereof may be appended or otherwise associated with GPS data requested from the GPS module 225 to indicate where the images or frames were captured. For example, the analysis module 230 may be configured to collect three images or frames per second each time a face enters the frame. The images and/or frames may be collected from a video or still image capture device (e.g., from the image capture device collecting video for streaming and/or other image capture device such as a still image capture device when multiple image capture devices are available). In either instance, high-quality visual data corresponding to the detected face is collected. In turn, at the conclusion of a broadcast stream, the analysis module 230 may have locally stored a number of face images on the device with corresponding GPS data. The analysis module 230 may locally store data (e.g., encrypted) and transmit the data (e.g., to the agency service) at the conclusion of a broadcast (e.g., wait for WiFi connection) as described previously herein to mitigate discovery issues, etc. Facial image data and their accompanying GPS data may also be sent automatically to state and federal law enforcement systems which utilize facial recognition (e.g., identification and normalization of facial features from an image) for cross-checking facial images with the faces of criminals with outstanding arrest warrants.

In some embodiments, the analysis module 230 may additionally analyze captured visual image data to detect license plates. A license plate detection process may occur in a substantially similar manner to the facial image capture process described above, except that the analysis module 230 detects license plate frames within image data as opposed to human faces. Accordingly, when license plates enter the frame of captured video data, the analysis module 230 detects the license plate and stores a corresponding image and/or frame or series thereof which may be associated with GPS data. In turn, the images of license plates may be transmitted to the agency service for license plate recognition (e.g., recognition of plate numbers/letters etc. from an image) and/or cross-referenced with law enforcement databases that utilize license plate recognition to identify stolen vehicles and registrants with outstanding arrest warrants.

In some embodiments, the analysis module 230 analyzes collected audio for speech. Collected audio (and/or segments thereof) including speech may be queried to a speech-to-text Application Programming Interfaces (APIs) such as Google Speech API or IBM Watson Speech to Text in order to caption videos for accessibility and/or for inclusion in police reports. In some embodiments, the analysis module 230 queries an API with collected audio including speech. In some embodiments, the agency service may perform this operation in conjunction with providing streams to viewers and/or as post processing for previously broadcast streams. In either instance, the analysis module 230 may comprise lightweight speech detection in order to identify segments of audio that contain human speech for querying an API in real-time (e.g., so that whole audio streams need not be processed for fill speech to text until a post processing step by the agency service). In general, transcriptions (e.g., by the agency service over full audio stream and/or segments queried to APIs in real-time) may additionally detect and alert on keywords of interest to law enforcement (e.g., from processing thereof at the agency service), such as a suspect's name, and permit text-based search of video results. In turn, in instances where detected speech is translated to text in near real time, the agency service may transmit one or more notifications to a streaming using based on the result. Speech-to-text results may also be sent to human or machine-powered translation engines, such as the Google Cloud Translation API or IBM Watson's Language Translator to convert Spanish to English, for example.

Example Graphical User Interfaces

Figure 3A:
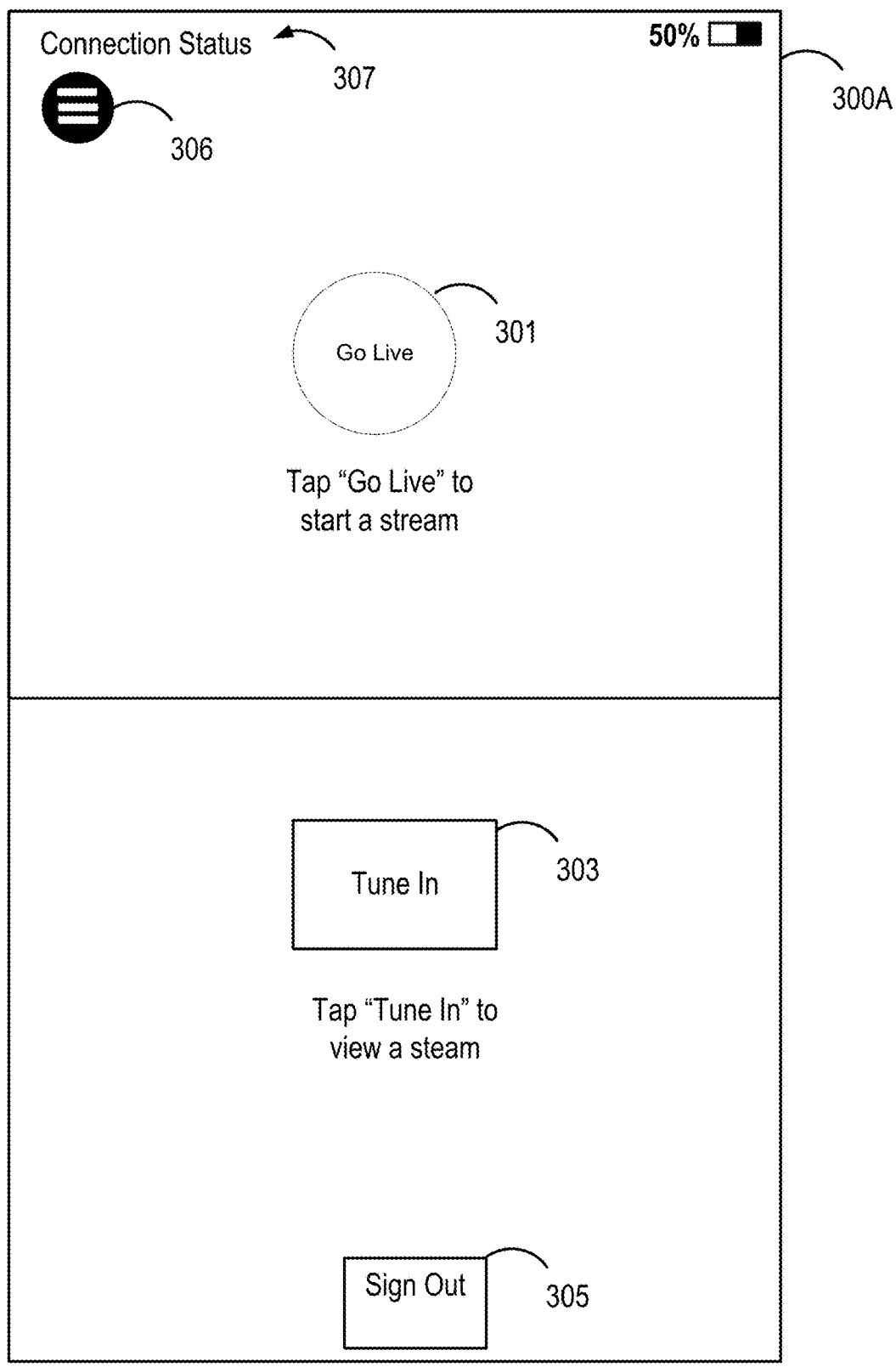
FIG. 3A is an example graphical user interface illustrating options for starting or viewing a stream with a BWC application, according to an example embodiment.

FIG. 3A is an example graphical user interface (GUI) illustrating options for starting or viewing a stream with a BWC application, according to an example embodiment. In one embodiment, a BWC application 141 generates the interface 300A shown in FIG. 3A on a device (such as a mobile telephonic device) to which it is installed (e.g., transmitting and/or viewing devices 101, 105) when a user executes the application and has registered and/or logged into the BWC application (e.g., a user interface displayed to registered users when they are logged in). Depending on user permissions received from the agency service for a logged in user, the BWC application 141 may permit the logged in user to Go Live 301 and/or Tune In 303.

As shown, the interface 300A displays both the option to Go Live 301 and Tune In 303. Based on user permissions, a BWC application may display only those options within the interface which the user is permitted to use or otherwise indicate within the interface which options the user is permitted to access (e.g., by greying out or otherwise indicating "Go Live" 301 is not available if the user is only permitted to "Tune In" 303 or vice versa).

The interface 300A may include a selectable menu 306 which users have the option to select to present one or more options and/or additional interfaces to configure registration information, log in, and/or configure other user preferences such as notifications, peripheral audio/image capture devices, etc. that are discussed herein.

The interface 300A may display an option to sign out 305, which when selected causes the BWC application to cease the display and/or allow the selection of options (e.g., 301, 303) only available to users while they are logged in. Additionally, the interface 300A may display a current connection status 307 that indicates current network conditions at the device so that the user remains appraised of their device's ability to stream and view streams.

The interface 300A may display a selectable element for the user to Go Live 301. In response to the selection of Go Live 301, the BWC application may generate an interface similar to that discussed with reference to FIG. 3B which displays options associated with the streaming of audio/visual data. In some embodiments, the BWC application presents a selection of available channels the user may stream on in response to the selection of Go Live 301, or defaults to a given channel which the user may change subsequently.

The interface 300A may display a selectable element for the user to Tune In 303. In response to the selection of Tune In 303, the BWC application may generate an interface similar to that discussed with reference to FIG. 3C which displays options associated with the viewing of streamed audio/visual data. In some embodiments, the BWC application presents a selection of available channels the user may stream on in response to the selection of Tune In 303, or defaults to a given channel which the user may change subsequently.

Figure 3B:
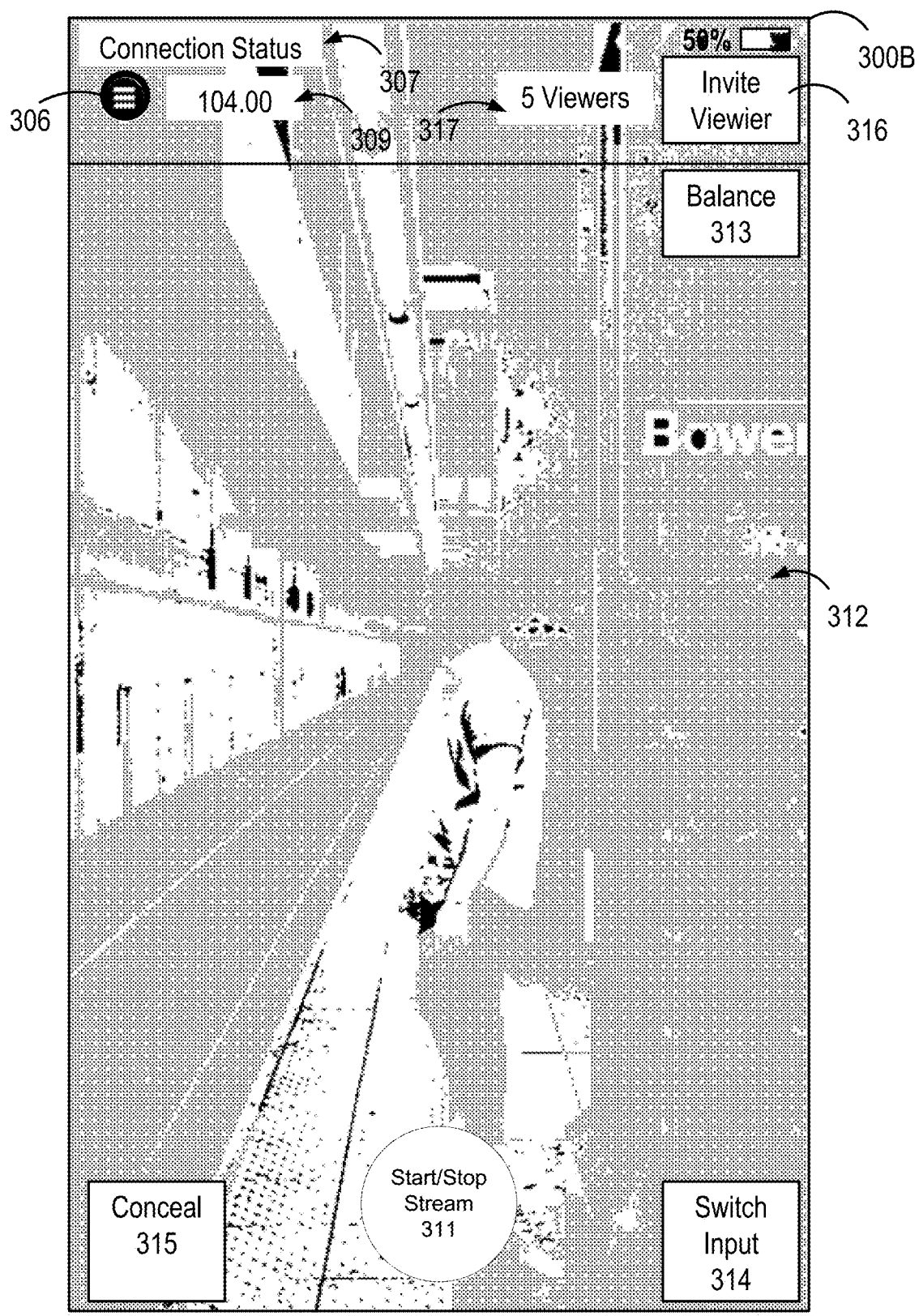
FIG. 3B is an example graphical user interface illustrating options for streaming captured audio/visual data, according to an example embodiment.

FIG. 3B is an example graphical user interface 300B illustrating options for streaming captured audio/visual data, according to an example embodiment. In one embodiment, a BWC application 141 generates the interface 300B shown in FIG. 3B on a device (such as a mobile telephonic device) to which it is installed (e.g., transmitting device 101) when a user opts to Go Live (e.g., transmit a stream). The BWC application 141 may permit the user to start/stop streaming 311 through the interface.

As shown, the interface 300B displays a selectable element option to start/stop a stream 311. The element to start/stop a stream 311 may change visually and/or textually (e.g., associated text displayed within the interface) to indicate whether selection starts or stops the stream. Thus, the user may toggle the option to start/stop a stream 311 as desired to start and stop the capture and streaming of audio/visual data. The interface 300B may display visual data 312 corresponding to the data to be captured if the user selects the option to start a stream or the data being captured while the user is actively streaming (e.g., in response to selecting the option to start a stream). Additionally, the interface 300B may indicate a channel 309 on which the user is and/or has selected to stream data. Other pertinent data to streaming may also be displayed, such as a current connection status 307 that indicates current network conditions at the device so that the user remains appraised of their device's ability to stream and a number of viewers 317 currently viewing the channel selected for streaming and/or the stream (if the device is actively streaming).

The user may change the channel 309 such as by tapping on the visual indication of the channel and/or through a menu 306 which comprises one or more configurable options for streaming. Thus, for example, the interface 300B may include a selectable menu 306 which users have the option to select to present one or more options and/or additional interfaces to configure preferences for streaming, notifications, peripheral audio/image capture devices, etc. that are discussed herein. Common options may be displayed directly within the interface, the configuration of which may be altered within the menu 306.

In various embodiments, the interface 300B displays an invite viewer 316 option which a user may select to invite other users to view their stream, a balance option 313 which the user may select while streaming to locally store a high-quality segment of streamed data (e.g., visual data 312), a conceal 315 option to display a mimicked interface to hide the streaming interface, and/or a switch input 314 option to cycle through and/or select from a different capture device for capturing stream data. Other options (e.g., chat, etc.) discussed with reference the BWC application and especially a transmitting module of the BWC application may be displayed within the interface 300B and/or accessed through the menu 306.

Figure 3C:
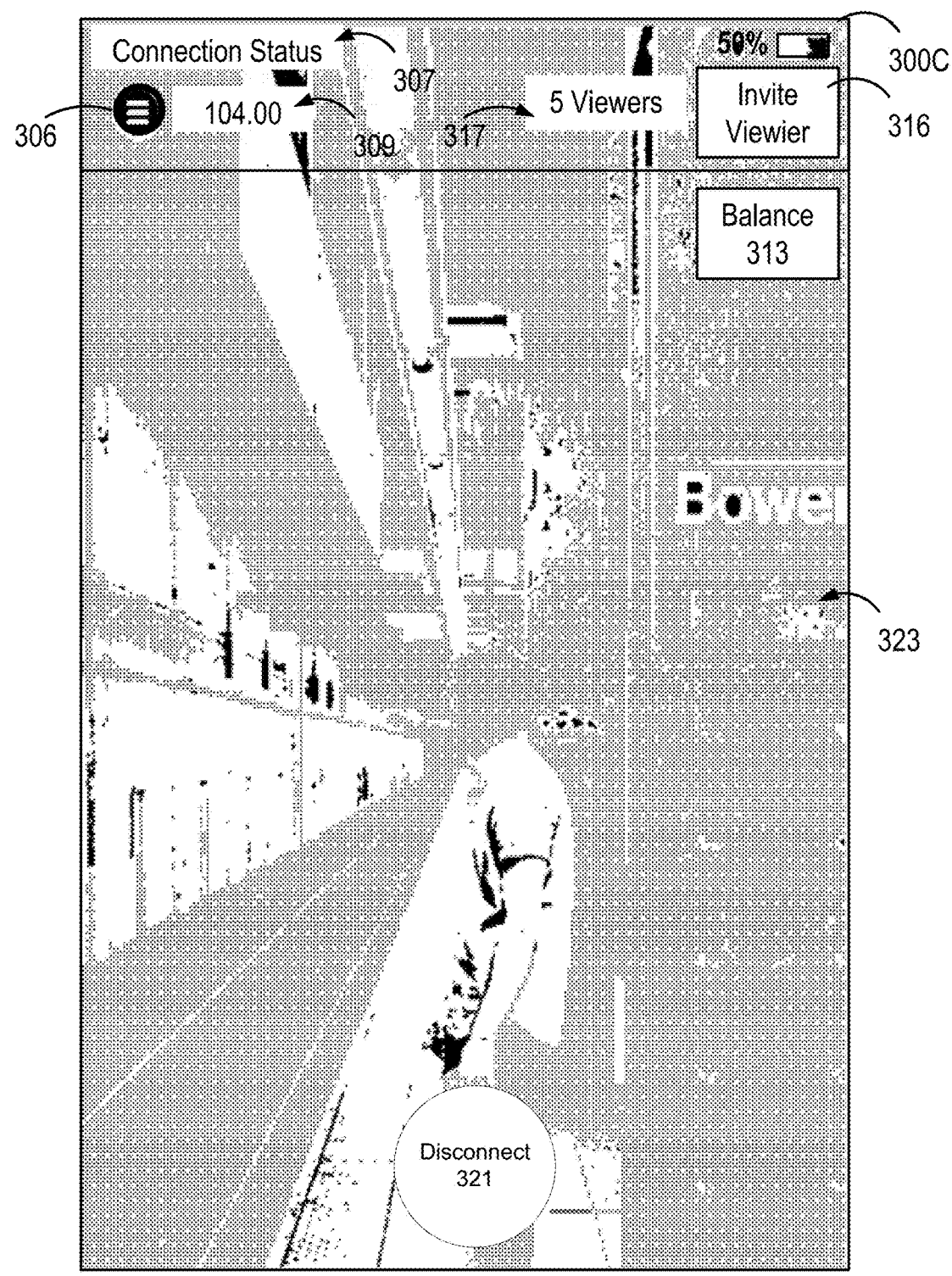
FIG. 3C is an example graphical user interface illustrating options for viewing streams of captured audio/visual data, according to an example embodiment.

FIG. 3C is an example graphical user interface 300C illustrating options for viewing streams of captured audio/visual data, according to an example embodiment. In one embodiment, a BWC application 141 generates the interface 300C shown in FIG. 3C on a device (such as a mobile telephonic device) to which it is installed (e.g., viewing device 105) when a user opts to Tune In (e.g., view a stream). The BWC application 141 may permit the user to disconnect 321 from a viewed stream through the interface.

As shown, the interface 300C displays a selectable element option to disconnect 321 from a viewed stream. Streamed visual data 323 corresponding to a viewed stream is displayed within the interface. Additionally, the interface 300C may indicate a channel 309 which the user is viewing stream data 323 and/or has selected to view stream data (if there is no live stream data and/or the user is selecting from historical streams). Other pertinent data to streaming may also be displayed, such as a current connection status 307 that indicates current network conditions at the device so that the user remains appraised of their device's ability to view streams and a number of viewers 317 currently viewing the channel and/or stream in the case of viewing live or who was viewing a historical stream when it was originally broadcast.

The user may change the channel 309 such as by tapping on the visual indication of the channel and/or through a menu 306 which comprises one or more configurable options for viewing. Thus, for example, the interface 300C may include a selectable menu 306 which users have the option to select to present one or more options and/or additional interfaces to configure preferences for viewing, notifications, etc. that are discussed herein. Common options may be displayed directly within the interface, the configuration of which may be altered within the menu 306.

In various embodiments, the interface 300C displays an invite viewer 316 option which a user may select to invite other users to view the stream they are viewing and a balance option 313 which the user may select while viewing a live-stream to cause the streaming device to locally store a high-quality segment of streamed data (e.g., a high-quality version of the viewed visual data 323). Other options (e.g., barge in, distress alerts, chat, etc.) discussed with reference the BWC application and especially a viewing module of the BWC application may be displayed within the interface 300C and/or accessed through the menu 306.

In some embodiments, one or more of the interfaces 300 may be accessible from the agency service over a network, such as via a web browser. Thus, for example, a user may view streams and/or stream from a laptop device by accessing a web portal (e.g., by browsing to a URL and entering a username/password combination) provided by the agency service that displays one or more interfaces with one or more options similar to those discussed with reference to FIGS. 3A, 3B, and 3C. Such access with a laptop or personal computer may be preferable for reviewing captured audio/visual data of historical streams for evidence.

Example Computing and/or Mobile Computing Device

Figure 4:
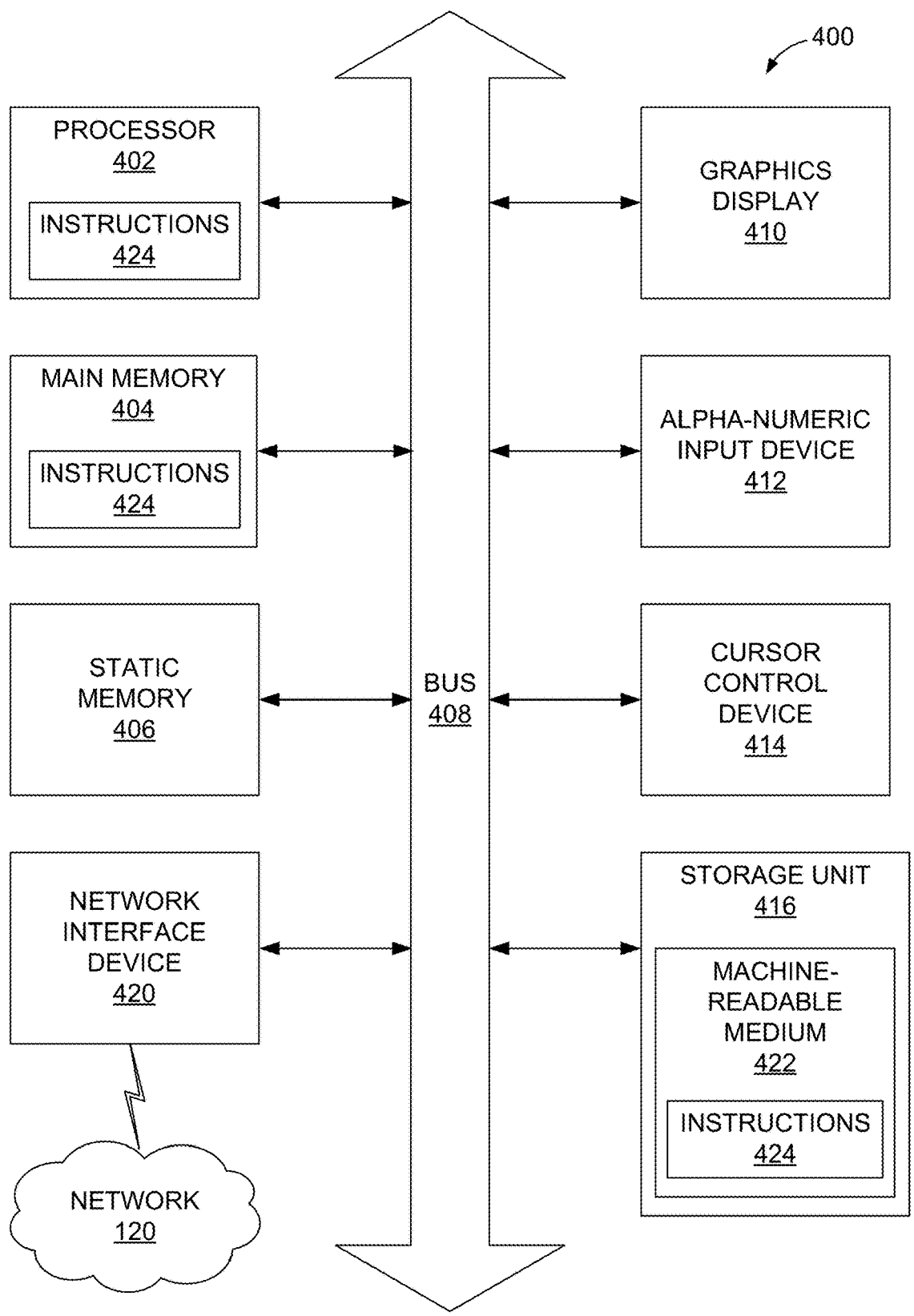
FIG. 4 is a block diagram illustrating an example architecture and example components of a computing device that may be utilized to perform one or more functions ascribed to a computing, storage, mobile, and/or other device described herein, according to example embodiments.

FIG. 4 illustrates an example architecture of a computing device. Portions or all of the components of the architecture may correspond to components in embodiments of computing devices such as officer devices (or other user devices) used as transmitting devices and/or viewing devices, as well as the agency service including the stream storage and/or management server. Example devices may include smartphones (e.g., mobile telephonic devices), laptops, other mobile devices, and server system devices such as storage and/or processing servers.

As such, FIG. 4 illustrates components able to read instructions from a machine-readable medium and execute them on one or more processors (or controllers) to implement embodiments of the disclosed system for configuring existing work and/or personal mobile phones of law enforcement officers (and other first responders) to securely record and transmit captured audio and visual data to other officers (and/or other first responders) in real-time. For example, transmitting device 101, viewing device 105, agency service 115 and components such as the stream storage 122 and management server 121, among other entities described herein may include one or more of the components illustrated in FIG. 4. Specifically, FIG. 4 shows a diagrammatic representation of example architecture of a device in the example form of a computer system 400 within which instructions 424 (e.g., software or program code) that cause the device to perform any one or more of the methodologies discussed herein may be executed. In alternative embodiments, the device operates as a standalone device or may be connected (e.g., networked) to other machines. In a networked deployment, the device may operate in the capacity of a server device or a client device in a server-client network environment, or as a peer device in a peer-to-peer (or distributed) network environment. It is noted that the instructions may be part of a computer program product that may be stored in a non-transitory computer readable storage medium. The instructions may be executed by one or more processors.

The device may be a server computer, a client computer, a personal computer (PC), a tablet PC, a set-top box (STB), a personal digital assistant (PDA), a cellular telephone, a smart phone, other mobile device, a web appliance, an internet of things (IoT) device, a network router, switch or bridge, or any machine capable of executing instructions 424 (sequential or otherwise) that specify actions to be taken by that device. Further, while only a single device is illustrated, the term "device" shall also be taken to include any collection of device that individually or jointly execute instructions 424 to perform any one or more of the methodologies discussed herein.

The example computer system 400 includes one or more processors 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or the like. The computer system 400 may also include alphanumeric input device 412 (e.g., a keyboard—hardware and/or software based), a cursor control device 414 (e.g., touch screen response, a mouse, a trackball, a joystick, a motion sensor, or other pointing instrument), a storage unit 416, and a network interface device 420, which also are configured to communicate via the bus 408.

The storage unit 416 includes a machine-readable medium 422 on which is stored instructions 424 (e.g., software) embodying any one or more of the methodologies or functions described herein that may be executed by a processor 402 for device operation (e.g., client, host, proxy, and/or token service devices). The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 120 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the device (e.g., client, proxy, host and/or token service) and that cause the device to perform any one or more of the methodologies disclosed herein. The term "machine-readable medium" includes, but not be limited to, data repositories in the form of solid-state memories, optical media, and magnetic media.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method for configuring a mobile telephonic device to live-stream in law enforcement, the method comprising:
    providing a body worn camera (BWC) application to the mobile telephonic device, the BWC application when executed by the mobile telephonic device configured to:
        transmit a registration request comprising device information for the mobile telephonic device and user information;
        display a transmitting option on a user interface of the mobile telephonic device based on user permissions received responsive to the registration request;
        capture audio data using a microphone built in to the mobile telephonic device, and visual data using a camera built in to the mobile telephonic device, responsive to a user selection, from a first user of the mobile telephonic device, of the transmitting option from the user interface of the mobile telephonic device;
        separately stream, during the capture, the audio data over a first stream and the visual data over a second stream, from the mobile telephonic device, to a receiving device, for display at the receiving device; and
        responsive to detecting degradation in quality of connection between the mobile telephonic device and the receiving device:
            reduce the resolution of the second stream for transmission while the first stream and the second stream are being streamed from the mobile telephonic device to the receiving device; and
            store a high-resolution and encrypted version of the second stream to local memory of the mobile telephonic device while continuing to transmit the second stream to the receiving device at the reduced resolution, and while not transmitting the high-resolution and encrypted version of the second stream to the receiving device.

2. The method of claim 1, wherein a balance trigger is detected from the receiving device.

3. The method of claim 2, wherein the BWC application is further configured to:
    locally store the segment of captured video data in high resolution for a duration of time that is predetermined, the duration of time elapsing from a beginning time of the receipt of the balance trigger.

4. The method of claim 2, wherein the BWC application is further configured to terminate local storage of the second stream, while continuing to transmit the second stream to the receiving device, responsive to a stop balance trigger.

5. The method of claim 1, wherein modifying parameters associated with the second stream to prioritize the first stream comprises:
    reducing a bitrate associated with the second stream, and wherein the bitrate is reduced responsive to a determination of an available bandwidth to the mobile telephonic device.

6. The method of claim 5, wherein the BWC application is further configured to:
    locally store a segment of captured video data in high resolution for a duration of time from a beginning time the available bandwidth falls below a threshold available bandwidth.

7. The method of claim 5, wherein the BWC application is further configured to:
    encrypt the locally stored segment;
    transmit the locally stored segment after a conclusion of streaming operations; and
    purge the locally stored segment subsequent to transmission.

8. The method of claim 1, further comprising:
    providing a second BWC application to a second mobile telephonic device, the second BWC application when executed by the second telephonic device configured to:
        transmit a second registration request comprising device information for the second mobile telephonic device and second user information;
        display a viewing option based on second user permissions received responsive to the second registration request;
        retrieve a version of the audio data and the visual data responsive to a second user selection of the viewing option; and
        play back the retrieved version of the audio data and the visual data.

9. The method of claim 8, wherein the second BWC application is further configured to transmit a balance start trigger responsive to second user input while playing back the retrieved version of the audio data and the video data, the balance start trigger causing the first BWC application to locally store a segment of captured video data in high resolution, the method further comprising:
    receiving the first stream and the second stream from the first telephonic device;
    storing the audio data received in the first stream and the video data received in the second stream;
    synchronizing the audio data and the video data and transmitting a synchronized stream to the second telephonic device;
    receiving the segment of captured video data in high resolution following conclusion of the receiving of the first stream and the second stream; and
    updating the stored video data received in the second stream to include the segment of captured video data in high resolution.

10. The method of claim 9, wherein the segment of captured video data in high resolution is encrypted, the method further comprising:
  decrypting the segment of captured video data in high resolution; and
  wherein the first BWC application encrypts the locally stored segment of captured video data and purges the locally stored segment subsequent to transmission.

11. A system for configuring a mobile telephonic device to live-stream in law enforcement, the system comprising:
  an agency service configured to provide a body worn camera (BWC) application to the mobile telephonic device, the BWC application when executed by the mobile telephonic device configured to:
    transmit a registration request comprising device information for the mobile telephonic device and user information;
    display a transmitting option on a user interface of the mobile telephonic device based on user permissions received responsive to the registration request;
    capture audio data using a microphone built in to the mobile telephonic device, and visual data using a camera built in to the mobile telephonic device, responsive to a user selection, from a first user of the mobile telephonic device, of the transmitting option from the user interface of the mobile telephonic device;
    separately stream, during the capture, the audio data over a first stream and the visual data over a second stream, from the mobile telephonic device, to a receiving device for display at the receiving device; and
    responsive to detecting degradation in quality of connection between the mobile telephonic device and the receiving device:
      reduce the resolution of the second stream for transmission while the first stream and the second stream are being streamed from the mobile telephonic device to the receiving device; and
      store a high-resolution and encrypted version of the second stream to local memory of the mobile telephonic device while continuing to transmit the second stream to the receiving device at the reduced resolution a high-resolution and encrypted version of the second stream to local memory of the mobile telephonic device while continuing to transmit the second stream to the receiving device at the reduced resolution, and while not transmitting the high-resolution and encrypted version of the second stream to the receiving device.

12. The system of claim 11, wherein a balance trigger is detected from the receiving device.

13. The system of claim 12, wherein the BWC application is further configured to:
  locally store the segment of captured video data in high resolution for a duration of time that is predetermined, the duration of time elapsing from a beginning time of the receipt of the balance trigger.

14. The system of claim 12, wherein the BWC application is further configured to terminate local storage of the second stream, while continuing to transmit the second stream to the receiving device, responsive to a stop balance trigger.

15. The system of claim 11, wherein modifying parameters associated with the second stream to prioritize the first stream comprises:
  reducing a bitrate associated with the second stream, and wherein the bitrate is reduced responsive to a determination of an available bandwidth to the mobile telephonic device.

16. The system of claim 15, wherein the BWC application is further configured to:
  locally store a segment of captured video data in high resolution for a duration of time from a beginning time the available bandwidth falls below a threshold available bandwidth.

17. The system of claim 15, wherein the BWC application is further configured to:
  encrypt the locally stored segment;
  transmit the locally stored segment after a conclusion of streaming operations; and
  purge the locally stored segment subsequent to transmission.

18. The system of claim 11, further comprising:
  providing, by the agency service, a second BWC application to a second mobile telephonic device, the second BWC application when executed by the second telephonic device configured to:
    transmit a second registration request comprising device information for the second mobile telephonic device and second user information;
    display a viewing option based on second user permissions received responsive to the second registration request;
    retrieve a version of the audio data and the visual data responsive to a second user selection of the viewing option; and
    playback the retrieved version of the audio data and the visual data.

19. The system of claim 18, wherein the second BWC application is further configured to transmit a balance start trigger responsive to second user input while playing back the retrieved version of the audio data and the video data, the balance start trigger causing the first BWC application to locally store a segment of captured video data in high resolution, the agency service further configured to:
  receive the first stream and the second stream from the first telephonic device;
  store the audio data received in the first stream and the video data received in the second stream;
  synchronize the audio data and the video data and transmitting a synchronized stream to the second telephonic device;
  receive the segment of captured video data in high resolution following conclusion of the receiving of the first stream and the second stream; and
  update the stored video data received in the second stream to include the segment of captured video data in high resolution.

20. The system of claim 19, wherein the segment of captured video data in high resolution is encrypted, the agency service further configured to:
  decrypt the segment of captured video data in high resolution; and
  wherein the first BWC application encrypts the locally stored segment of captured video data and purges the locally stored segment subsequent to transmission.

* * * * *